United States Patent [19]

Choi

[11] Patent Number: 5,815,304
[45] Date of Patent: Sep. 29, 1998

[54] THIN FILM ACTUATED MIRROR ARRAY IN A OPTICAL PROJECTION SYSTEM AND METHOD FOR MANUFACTURING THE SAME

[75] Inventor: Yoon-Joon Choi, Seoul, Rep. of Korea

[73] Assignee: Daewoo Electronics Co., Ltd., Seoul, Rep. of Korea

[21] Appl. No.: 792,453

[22] Filed: Jan. 31, 1997

[51] Int. Cl.$^6$ ............................................. G02B 26/00
[52] U.S. Cl. ................... 359/291; 359/295; 359/850; 359/212
[58] Field of Search .................... 359/290, 291, 359/295, 846, 847, 848, 849, 850, 851, 212, 213, 214, 223, 224

[56] References Cited

U.S. PATENT DOCUMENTS

| | | | |
|---|---|---|---|
| 5,126,836 | 6/1992 | Um | 359/618 |
| 5,469,302 | 11/1995 | Lim | 359/291 |
| 5,579,179 | 11/1996 | Ji et al. | 359/291 |
| 5,604,623 | 2/1997 | Ji et al. | 359/295 |
| 5,608,569 | 3/1997 | Kim | 359/291 |
| 5,627,673 | 5/1997 | Min | 359/290 |
| 5,636,070 | 6/1997 | Ji et al. | 359/290 |

Primary Examiner—Georgia Y. Epps
Assistant Examiner—Dawn-Marie Bey
Attorney, Agent, or Firm—Cushman Darby & Cushman Intellectual Property Group of Pillsbury Madison & Sutro, LLP

[57] ABSTRACT

Thin film AMA in an optical projection system and a method for manufacturing the same are disclosed. The thin film AMA has a substrate having electrical wiring and a connecting terminal, an actuator, and a reflecting member. The actuator has a supporting layer, a bottom electrode, an active layer, and a top electrode. The supporting layer has a first portion attached beneath the bottom electrode and a second portion exposed out of bottom electrode. The reflecting member is formed on the second portion of supporting layer. The supporting layer tilts with the actuator. Hence, the thin film AMA has much enhanced light efficiency of the right reflected by the reflecting member by minimizing the area of the actuator and maximizing the area of the reflecting member, so the quality of a picture projected onto a screen is greatly increased.

27 Claims, 21 Drawing Sheets

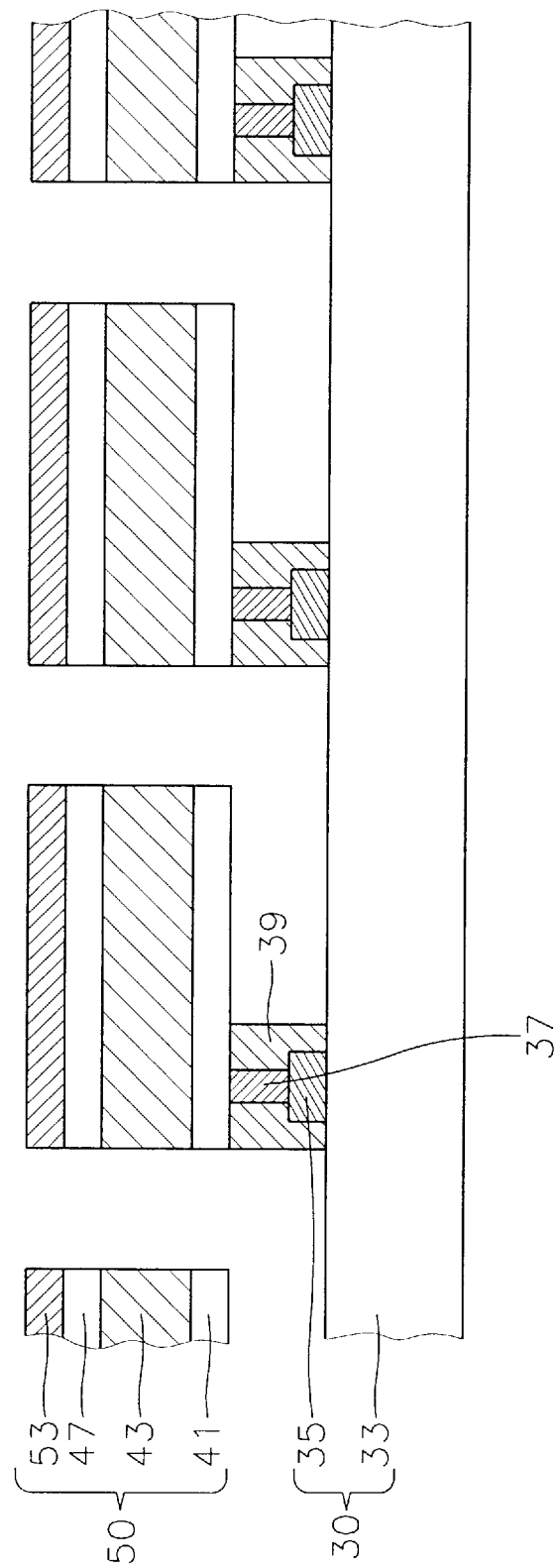

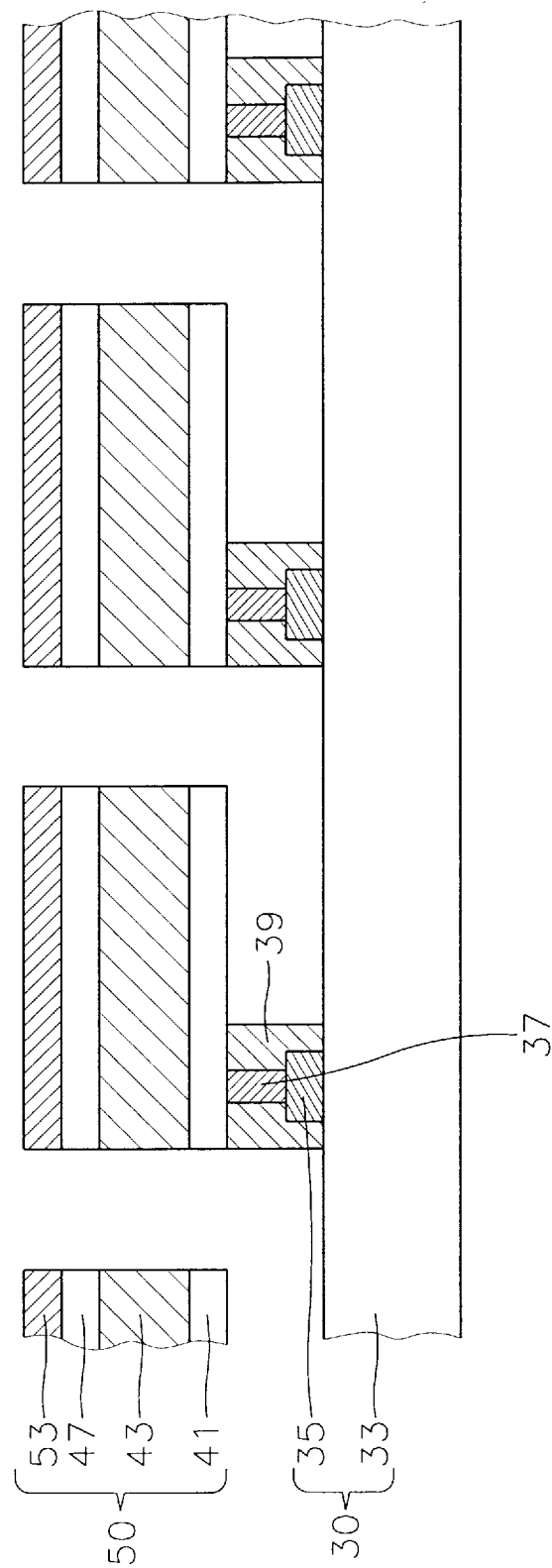

THIN FILM ACTUATED MIRROR ARRAY IN A OPTICAL PROJECTION SYSTEM AND METHOD FOR MANUFACTURING THE SAME

BACKGROUND OF THE INVENTION

Field of the Invention

The present invention relates to a thin film actuated mirror array in an optical projection system and to a method for manufacturing the same, and more particularly to a thin film actuated mirror array in an optical projection system having an actuator which is actuated by a predetermined angle and a reflecting member for reflecting incident light which is separately formed from the actuator in order to enhance light efficiency by minimizing the area of the actuator and maximizing the area of the reflecting member, so the quality and the contrast of a picture projected onto a screen are increased, and to a method for manufacturing the same.

In general, light modulators are divided into two groups according to their optics. One type is a direct light modulator such as a cathode ray tube (CRT) and the other type is a transmissive light modulator such as a liquid crystal display (LCD). The CRT produces superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5% and the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from light source 1 passes a first slit 3 and a first lens 5 and is divided into red, green, and blue lights according to the Red.Green.Blue (R.G.B) system of color representation. After the divided red, green, and blue lights are respectively reflected by a first mirror 7, a second mirror 9, and a third mirror 11, the reflected lights are respectively incident on AMA devices 13, 15 and 17 corresponding to the mirrors 7, 9 and 11. The AMA devices 13, 15 and 17 tilt the mirrors installed therein, so the incident light is reflected by the mirrors. In this case, the mirrors installed in the AMA devices 13, 15 and 17 are tilted according to the deformation of active layers formed under the mirrors. The light reflected by the AMA devices 13, 15 and 17 pass a second lens 19 and a second slit 21 and form a picture on a screen (not shown) by using projection lens 23.

In most cases, ZnO is used as the active layer. However, lead zirconate titanate (PZT:Pb(Zr,Ti)O$_3$) has a better piezoelectric property than ZnO. PZT is a complete solid solution of lead zirconate (PbZrO$_3$) and lead titanate(PbTiO$_3$). A cubic structure PZT exists in a paraelectric phase at a high temperature. An orthorhombic structure PZT exists in an antiferroelectric phase, a rhombohedral structure PZT exists in a ferroelectric phase, and a tetragonal structure PZT exists in a ferromagnetic phase according to the composition ratio of Zr and Ti at a room temperature. A morphotropic phase boundary (MPB) of the tetragonal phase and the rhombohedral phase exists as a composition which includes Zr:Ti at a ratio of 1:1. PZT has a maximum dielectric property and a maximum piezoelectric property at the MPB. The MPB exists in a wide region in which the tetragonal phase and the rhombohedral phase coexist, but does not exist at a certain composition. Researchers do not agree about the composition of the phase coexistent region of PZT. Various theories such as thermodynamic stability, compositional fluctuation, and internal stress have been suggested as the reason for the phase coexistent region. Nowadays, a PZT thin film is manufactured by various processes such as spin coating method, organometallic chemical vapor deposition (OMCVD) method, and sputtering method.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of a multilayer ceramic inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA which is manufactured by using semiconductor technology has been developed.

The thin film AMA is disclosed at U.S. Ser. No. 08/331, 399, entitled "THIN FILM ACTUATED MIRROR ARRAY AND METHOD FOR THE MANUFACTURE THEREOF", which is now pending in USPTO and is subject to an obligation to the assignee of this application.

FIG. 2 shows a cross sectional view of the thin film AMA. Referring to FIG. 2, the thin film AMA has an active matrix 30, an actuator 50 formed on the active matrix 30, and a mirror 53 installed on the actuator 50. The active matrix 30 has a substrate 33, M×N (M, N are integers) number of transistors (not shown) which are installed in the substrate 33, and M×N (M, N are integers) number of connecting terminals 35 respectively formed on the transistors.

The actuator 50 has a supporting member 39 formed on the active matrix 30 including connecting terminal 35, a second electrode 41 having a bottom of first portion thereof attached to the supporting member 39 and having a second portion formed parallel to the active matrix 30, a conduit 37 formed in the supporting member 39 so as to connect connecting terminal 35 to the second electrode 41, an active layer 43 formed on the second electrode 41, and a first electrode 47 formed on the active layer 43.

The mirror 53 is installed on the first electrode 47 to reflect incident light from a light source (not shown).

A manufacturing method of the thin film AMA will be described below. FIG. 3A to FIG. 3C illustrate manufacturing steps of the thin film AMA. In FIG. 3A to FIG. 3C, the same reference numbers are used for the same elements in FIG. 2.

Referring to FIG. 3A, at first, the active matrix 30, which includes the substrate 33 in which M×N number of transistors (not shown) are formed and M×N number of connecting terminals 35 respectively formed on the transistors, is provided. Subsequently, after a sacrificial layer 55 is formed on the active matrix 30, the sacrificial layer 55 is patterned in order to expose a portion of the active matrix 30 where connecting terminal 35 is formed. The sacrificial layer 55 can be removed by using chemicals or by etching.

Referring to FIG. 3B, the supporting member 39 is formed on the exposed portion of the active matrix 30 by sputtering method or Chemical Vapor Deposition (CVD) method. Next, after a hole is formed through supporting member 39, the conduit 37 is formed in supporting member 39 by filling the hole with an electrically conductive material, for example tungsten (W). The conduit 37 electrically connects the connecting terminal 35 to the second electrode 41 successively formed. The second electrode 41 is formed on the supporting member 39 and on the sacrificial layer 55 by using an electrically conductive material such as gold (Au) or silver (Ag). The active layer 43 is formed on the second electrode 41 by using a piezoelectric material, for example lead zirconate titanate (PZT). The first electrode 47 is formed on the active layer 43 by using an electrically conductive material such as gold (Au) or silver (Ag).

The transistor installed in the active matrix 30 converts a picture signal which is caused by the incident light from the light source into a picture signal current. The picture signal current is applied to the second electrode 41 through the connecting terminal 35 and the conduit 37. At the same time, a bias current from a common line (not shown) formed on the bottom of the active matrix 30 is applied to the first electrode 47, so an electric field is generated between the first electrode 47 and the second electrode 41. The active layer 43 formed between the first electrode 47 and the second electrode 41 is tilted by the electric field.

The mirror 53 is formed on the first electrode 47. The mirror reflects the incident light from the light source.

Referring to FIG. 3C, the mirror 53, the first electrode 47, the active layer 43 and the second electrode 41 are patterned one after another so that M×N number of pixels having predetermined shapes are formed. Consequently, after the sacrificial layer 55 is removed by etching, pixels are rinsed and dried in order to complete the thin film AMA.

However, in the above-described thin film AMA, the amount of the light reflected by the mirror is smaller than the amount of the light incident to the thin film AMA when considering the area of the thin film AMA, because a supporting portion of the mirror is larger than a reflecting portion of the mirror. That is, because the supporting portion of the mirror which supports the reflecting portion during a tilting of the mirror is larger than the reflecting portion of the mirror which actually reflects the incident light on the thin film AMA, the light efficiency decreases with respect to the actual area of the thin film AMA so that the quality of picture projected onto the screen by the thin film AMA decreases. In addition, the incident light is scattered at a position of supporting portion of the mirror which is adjacent to the reflecting portion of the mirror because the incident light is also reflected at the position of supporting portion. Hence, the quality of a picture projected onto the screen by the thin film AMA also decreases.

SUMMARY OF THE INVENTION

Accordingly, considering the conventional problems as described above, it is a first object of the present invention to provide a thin film actuated mirror array in an optical projection system having an actuator which is actuated by a predetermined angle and a reflecting member for reflecting incident light, which is separately formed from the actuator to have much enhanced light efficiency by minimizing the area of the actuator and maximizing the area of the reflecting member, so the quality and the contrast of a picture projected onto a screen are increased.

Also, it is a second object of the present invention to provide a method for manufacturing the above thin film actuated mirror array in an optical projection system.

To accomplish the above first object, there is provided in the present invention a thin film actuated mirror array in an optical projection system having a substrate, an actuator, and a reflecting member. The substrate has electrical wiring and a connecting terminal for receiving the first signal from outside and transmitting the first signal.

The actuator has a bottom electrode for receiving the first signal, a top electrode corresponding to the first bottom electrode for receiving the second signal and generating an electric field between the first top electrode and the first bottom electrode, a first active layer formed between the first top electrode and the first bottom electrode and deformed by the electric field, and a supporting layer having a first portion attached beneath the bottom electrode and a second portion exposed out of the bottom electrode.

The reflecting member for reflecting light is formed on the second portion of the supporting layer.

The actuator further has a via contact for transmitting the first signal from the connecting terminal to the bottom electrode. The via contact is formed in a via hole which is formed from a portion of the active layer to the connecting terminal through the bottom electrode and the supporting layer.

The supporting layer may be comprised of a rigid material and the bottom electrode may be comprised of an electrically conductive metal. The active layer may be comprised of a piezoelectric material or an electrostrictive material and the top electrode may be comprised of an electrically conductive and reflective metal.

Preferably, the supporting layer is comprised of a nitride or a metal and the bottom electrode is comprised of platinum, tantalum, or platinum-tantalum. The active layer may be comprised of $Pb(Zr, Ti)O_3$, $(Pb, La)(Zr, Ti)O_3$, or $Pb(Mg, Nb)O_3$ and the top electrode may be comprised of aluminum, platinum, or silver.

The bottom electrode, the active layer, and the top electrode each has a U-shape, and the second portion of the supporting layer has a rectangular shape. The bottom electrode is smaller than the first portion of the supporting layer, the active layer is smaller than the bottom electrode, and the top electrode is smaller than the active layer. Also, the reflecting member has a rectangular shape.

Preferably, the reflecting member is comprised of a reflective metal such as platinum, aluminum, or silver.

In order to accomplish the above second object, there is provided in the present invention a method for manufacturing a thin film actuated mirror array comprising the steps of:

providing a substrate having electrical wiring and a connecting terminal for receiving the first signal from outside and transmitting the first signal;

forming a first layer on the substrate;

forming a bottom electrode layer, a second layer and a top electrode layer on the first layer;

forming an actuator by patterning the top electrode layer to form a top electrode for receiving the second signal and generating an electric field, by patterning the second layer to form an active layer deformed by the electric field, by patterning the bottom electrode layer to form a bottom electrode for receiving the first signal, and by patterning the first layer to form a supporting layer having a first portion attached beneath the bottom electrode and a second portion exposed out of the bottom electrode;

forming a via hole from a portion of the active layer to the connecting terminal;

forming a via contact for transmitting the first signal to the bottom electrode from the connecting terminal, the via contact being formed in the via hole; and forming a reflecting means for reflecting a light at the second portion of the supporting layer.

The step of forming the first layer may be performed by a low pressure chemical vapor deposition method by using a nitride or a metal. The step of forming the bottom electrode layer may be performed by a sputtering method or a chemical vapor deposition method by using platinum, tantalum, or platinum-tantalum, and the step of forming the top electrode layer may be performed by a sputtering method or a chemical deposition method by using aluminum, platinum, tantalum or silver.

The step of forming the second layer may be performed by a sol-gel method, a sputtering method, or a chemical vapor deposition method by using $Pb(Zr, Ti)O_3$, $(Pb, La)(Zr, Ti)O_3$, or $Pb(Mg, Nb)O_3$.

The step of forming the second layer further comprises annealing the second layer by a rapid thermal annealing method and polling the second layer.

The step of forming the via contact may be performed by a sputtering method or a chemical vapor deposition method by using an electrically conductive metal.

The step of forming the reflecting member may be performed by a sputtering method or a chemical vapor deposition method by using platinum, aluminum, or silver.

In the thin film AMA according to the present invention, the first signal is applied from a pad of tape carrier package (TCP) to the bottom electrode via a panel pad of AMA, the electrical wiring, the connecting terminal, and the via contact. At the same time, the second signal is applied from the pad of TCP to the top electrode via the panel pad of AMA and a common line. Thus, an electric field is generated between the top electrode and the bottom electrode. The active layer formed between the top electrode and the bottom electrode is deformed by the electric field. The active layer is deformed in the direction perpendicular to the electric field. The actuator having the active layer is actuated in the opponent direction to the position where the supporting layer is positioned. That is, the actuator having the active layer is actuated upward, and the supporting layer attached to bottom electrode is also actuated upward according to the tilting of the actuator.

The reflecting member is formed on the central portion of the supporting layer. The reflecting member reflecting the incident light from a light source is actuated with the actuator. Hence, the reflecting member reflects the light onto the screen, so the picture is formed on the screen.

Therefore, in the thin film actuated mirror array in an optical projection system according to the present invention, the thin film AMA has the actuator actuating by a predetermined angle and the reflecting member for reflecting incident light which is separately formed from the actuator to have much enhanced light efficiency by minimizing the area of the actuator and maximizing the area of the reflecting member, so the quality of a picture projected onto a screen is greatly increased.

BRIEF DESCRIPTION OF THE DRAWINGS

The above objects and advantages of the present invention will become more apparent by describing in detail preferred embodiments thereof with reference to the attached drawings, in which:

FIG. 2 is a cross-sectional view for showing a thin film actuated mirror array in an optical projection system disclosed in a prior application of the assignee of this application;

FIGS. 3A to 3C illustrate manufacturing steps of the thin film actuated mirror array in an optical projection system in FIG. 2;

DETAILED DESCRIPTION OF THE INVENTION

Hereinafter, the preferred embodiments of the present invention will be explained in more detail with reference to the accompanying drawings.

Embodiment 1

Figure 1:
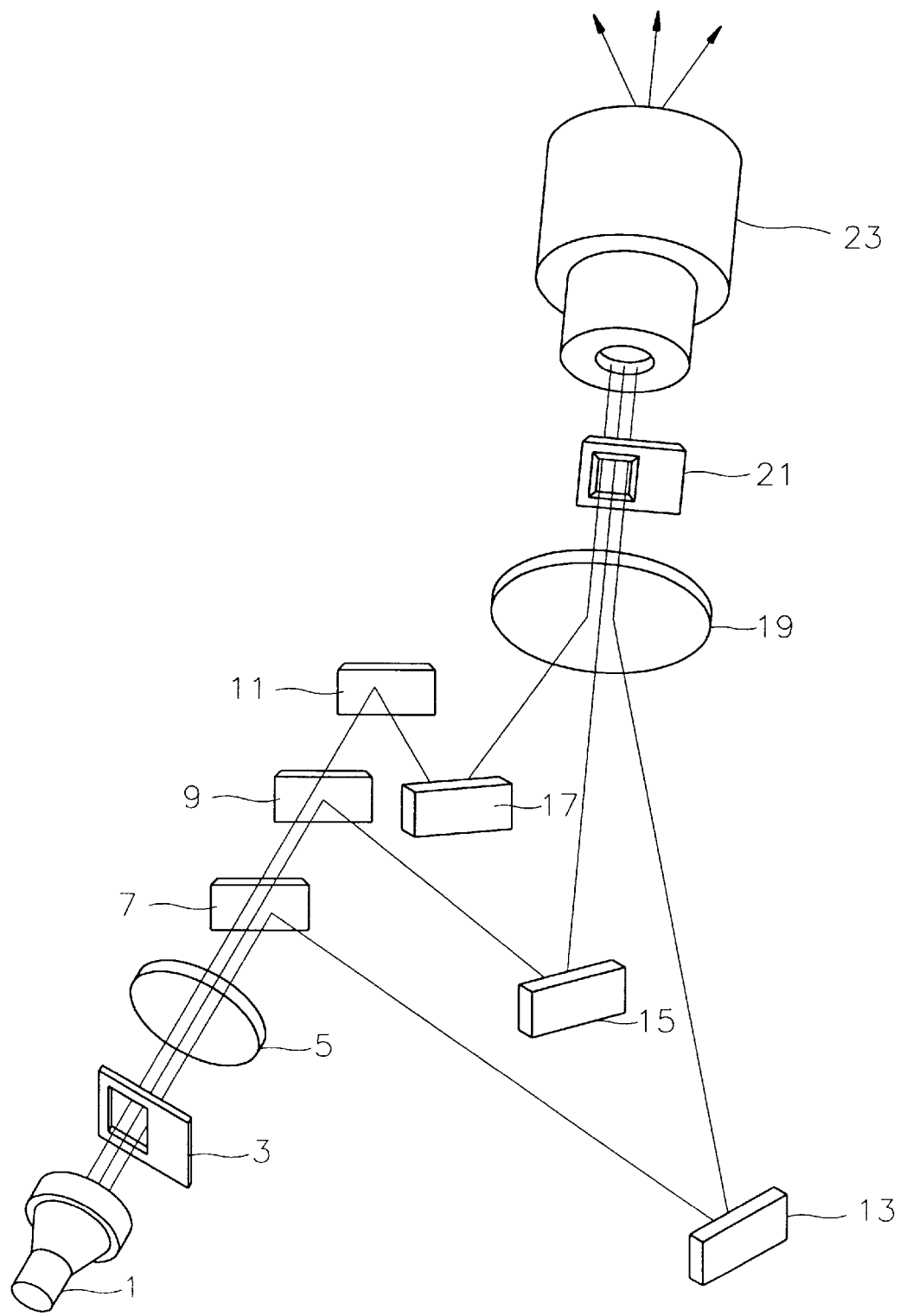
FIG. 1 is a schematic view for showing an engine system of a conventional actuated mirror array.
Figure 3A:
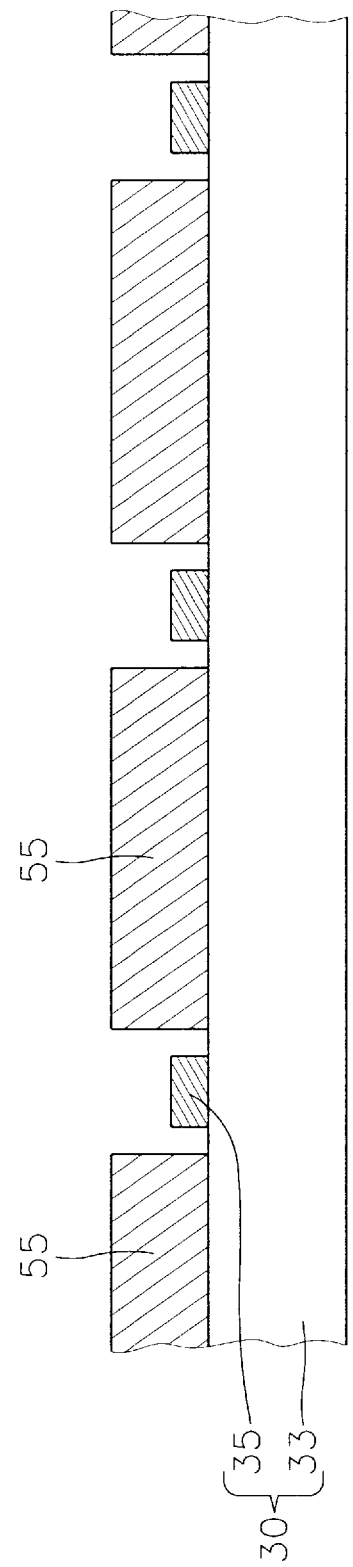
Figure 3B:
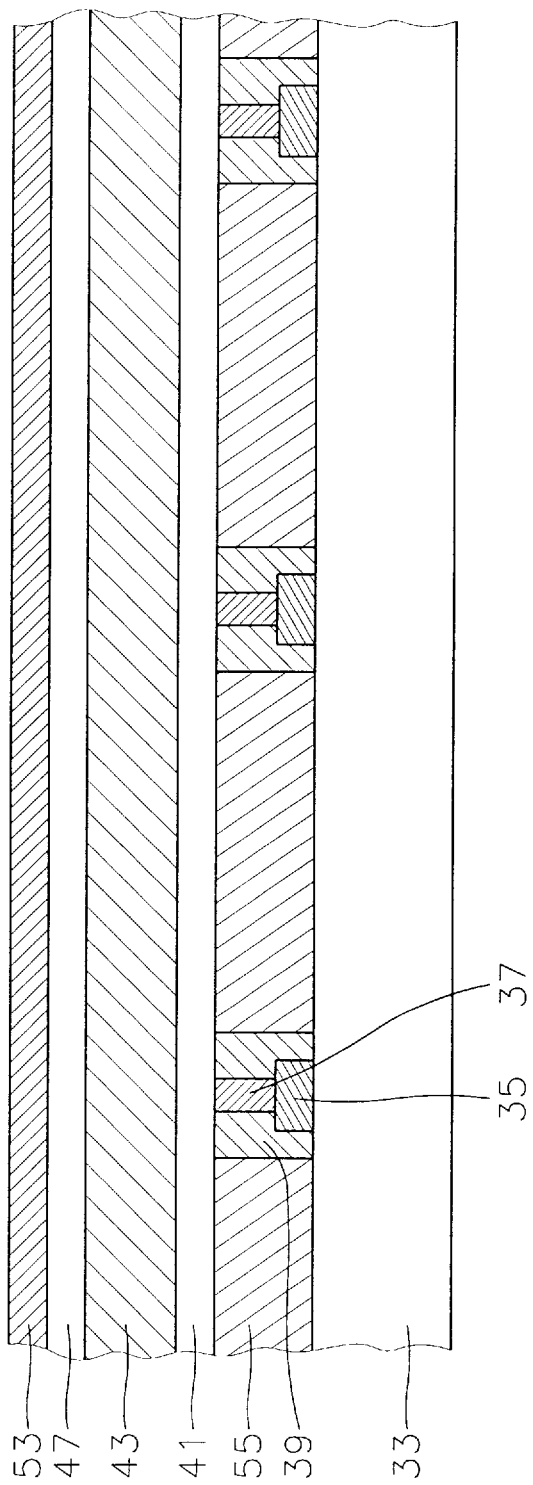
Figure 4:
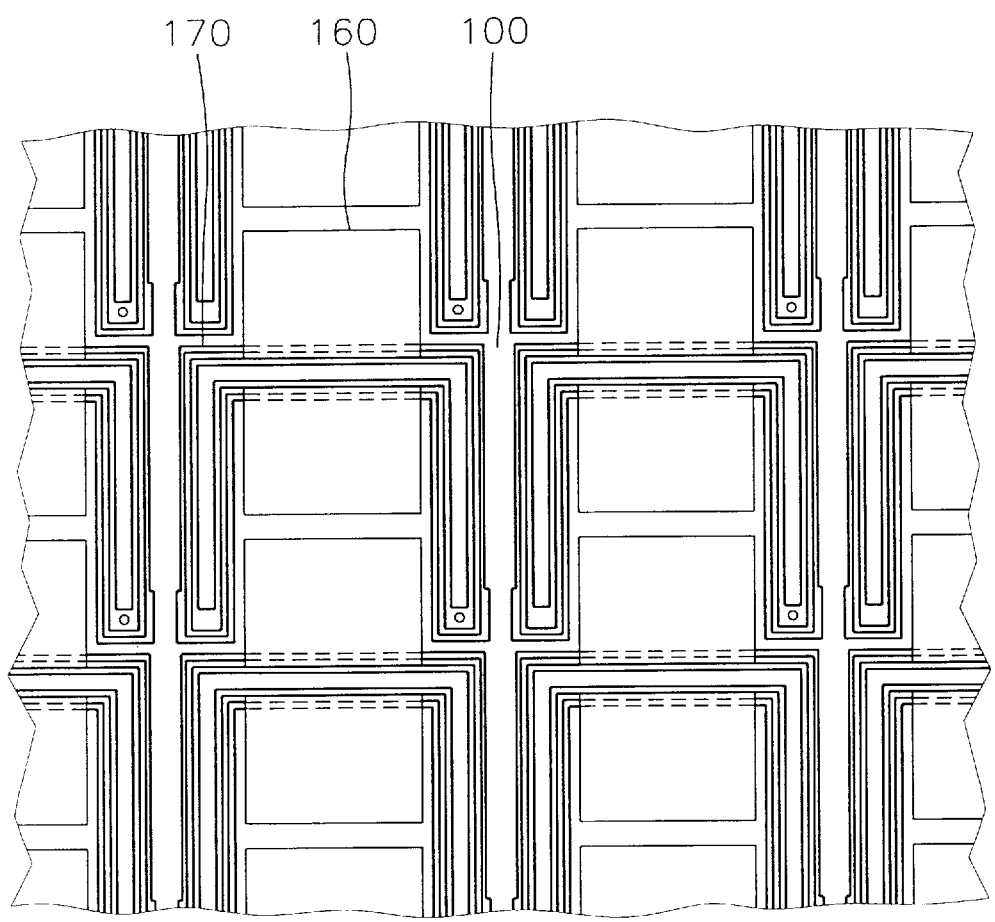
FIG. 4 is a plan view for showing a thin film actuated mirror array in an optical projection system according to a first embodiment of the present invention.
Figure 5:
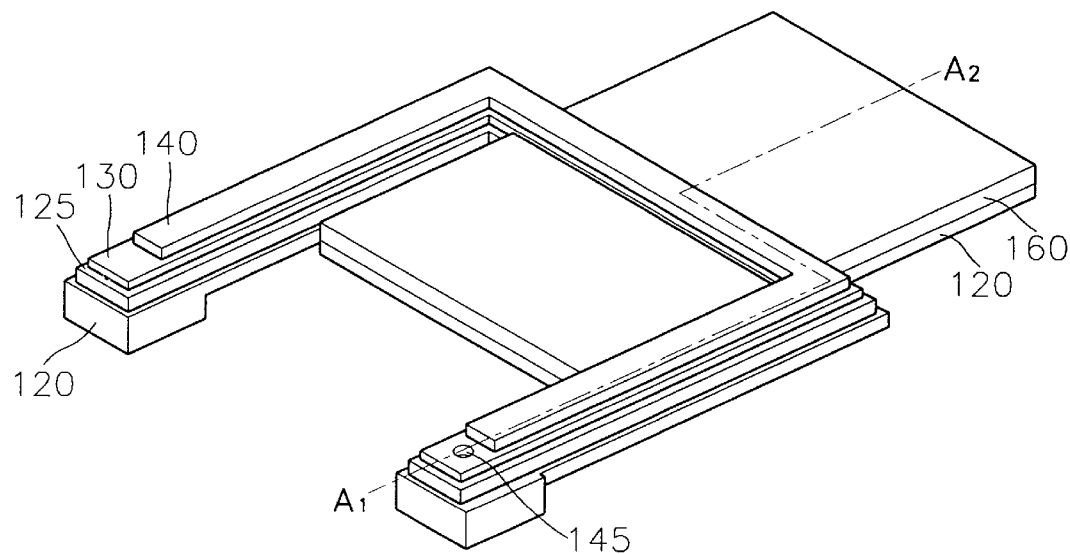
FIG. 5 is a perspective view for showing the thin film actuated mirror array in an optical projection system in FIG. 4.
Figure 6:
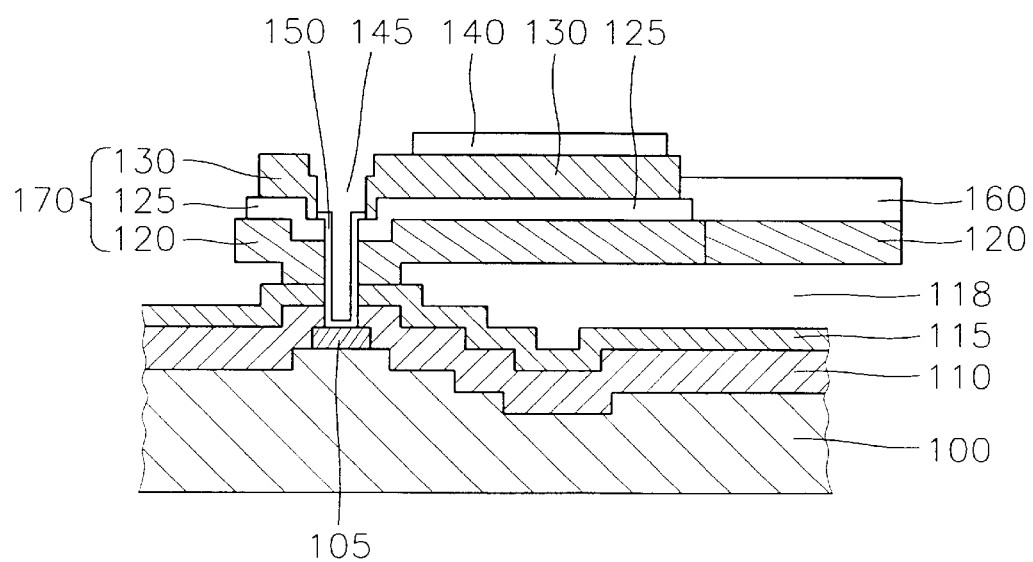
FIG. 6 is a cross-sectional view taken along line $A_1$–$A_2$ of FIG. 5.

FIG. 4 is a plan view for showing a thin film actuated mirror array in an optical projection system according to a first embodiment of the present invention, FIG. 5 is a projection view for showing the thin film actuated mirror array an optical projection system in FIG. 4, and FIG. 6 is a cross-sectional view taken along line $A_1$–$A_2$ of FIG. 5.

Referring to FIG. 4, the thin film AMA in an optical projection system according to the present embodiment has a substrate 100, an actuator 170 formed on the substrate 100, and a reflecting member 160 installed on a central portion of the actuator 170.

Referring to FIGS. 5 and 6, the substrate 100 having electrical wiring (not shown) has a connecting terminal 105 formed on the electrical wiring, a passivation layer 110 overlayed on the substrate 100 and on the connecting terminal 105, and an etch stop layer 115 overlayed on the passivation layer 110.

The actuator 170 has a bottom electrode 125, an active layer 130 formed on the bottom electrode 125, a top electrode 140 formed on the active layer 130, and the supporting layer 120 having a first portion attached beneath the bottom electrode 125 and a second portion exposed out of the bottom electrode 125. A via contact 150 is formed in a via hole 145 which is formed from a portion of the active layer 130 to the connecting terminal 105 through the bottom electrode 125.

Bottoms of both lateral borders of the supporting layer 120 are partially attached to the substrate 100. The lateral borders of the supporting layer 120 are parallelly formed from the attached portions. A central portion of the supporting layer 120 is integrally formed with the lateral borders between the lateral borders. The central portion of the supporting layer 120 has a rectangular shape. The bottom electrode 125 is formed on the central portion and on the lateral borders of the supporting layer 120. The bottom electrode 125 has a U-shape. The active layer 130 is smaller than the bottom electrode 125 and has the same shape as that of the bottom electrode 125. The top electrode 140 is smaller than the active layer 130 and has the same shape as that of the active layer 130.

The reflecting member 160 for reflecting an incident light is formed on the central portion of the supporting layer 120. The reflecting member 160 has a predetermined thickness from the surface of the supporting layer 120 to a portion of the active layer 130. Preferably, the reflecting member 160 has a rectangular shape and the reflecting member 160 is a mirror.

A method for manufacturing the thin film AMA in an optical projection system according to the present embodiment will be described as follows.

FIGS. 7 to 12B illustrate manufacturing steps of the thin film AMA according to the first embodiment of the present invention. In FIGS. 7 to 12B, the same reference numerals are used for the same elements in FIG. 6.

Figure 7:
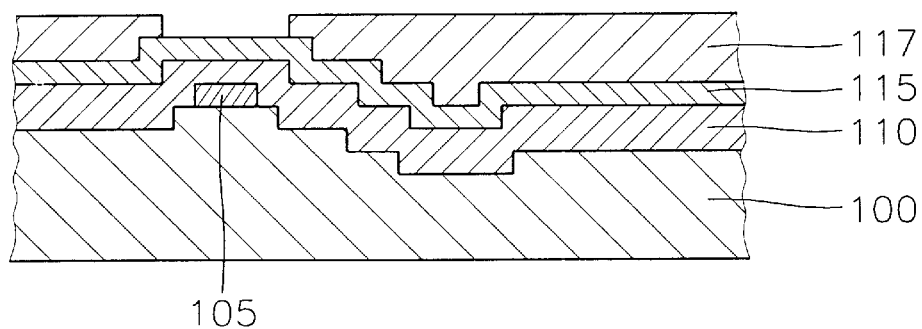
FIGS. 7 to 12B illustrate manufacturing steps of the thin film actuated mirror array in an optical projection system according to the first embodiment of the present invention.

Referring to FIG. 7, the passivation layer 110 is overlayed on the substrate 100 having the electrical wiring (not shown) and the connecting terminal 105. The electrical wiring and the connecting terminal 105 receive a first signal from outside, that is a picture current signal, and transmit the first signal to the bottom electrode 125. Preferably, the electrical wiring has a MOS transistor for switching operation. The connecting terminal 105 is formed by using a metal, for example tungsten (W). The connecting terminal 105 is electrically connected to the electrical wiring. The passivation layer 110 is formed by using Phosphor-Silicate Glass (PSG). The passivation layer 110 is formed by a chemical vapor deposition (CVD) method so that the passivation layer 110 has a thickness between about 0.1 $\mu$m and 1.0 $\mu$m. The passivation layer 110 protects the substrate 100 having the electrical wiring and the connecting terminal 105 during subsequent manufacturing steps.

The etch stop layer 115 is overlayed on the passivation layer 110 by using a nitride so that the etch stop layer 115 has a thickness of between about 1000 Å and 2000 Å. The etch stop layer 115 is formed by a low pressure chemical vapor deposition (LPCVD) method. The etch stop layer 115 protects the passivation layer 110 and the substrate 100 during subsequent etching steps.

A sacrificial layer 117 is overlayed on the etch stop layer 115 by using PSG. The sacrificial layer 117 is formed by an Atmospheric Pressure CVD (APCVD) method so that the sacrificial layer 117 has a thickness of between about 0.5 $\mu$m and 4.0 $\mu$m. In this case, the degree of flatness of the sacrificial layer 117 is poor because the sacrificial layer 117 covers the top of the substrate 100 having the electrical wiring and the connecting terminal 105. Therefore, the surface of the sacrificial layer 117 is planarized by using a Spin On Glass (SOG) or by a chemical mechanical polishing (CMP) method. Subsequently, a first portion of the sacrificial layer 117 having the connecting terminal 105 formed thereunder and a second portion of the sacrificial layer 117 which is adjacent to the first portion of the sacrificial layer 117 are patterned in order to expose a first portion of the etch stop layer 115 having the connecting terminal 105 formed thereunder and a second portion of the etch stop layer 115 which is adjacent to the first portion of the etch layer 115 with respect to form the supporting layer 120.

Figure 8:
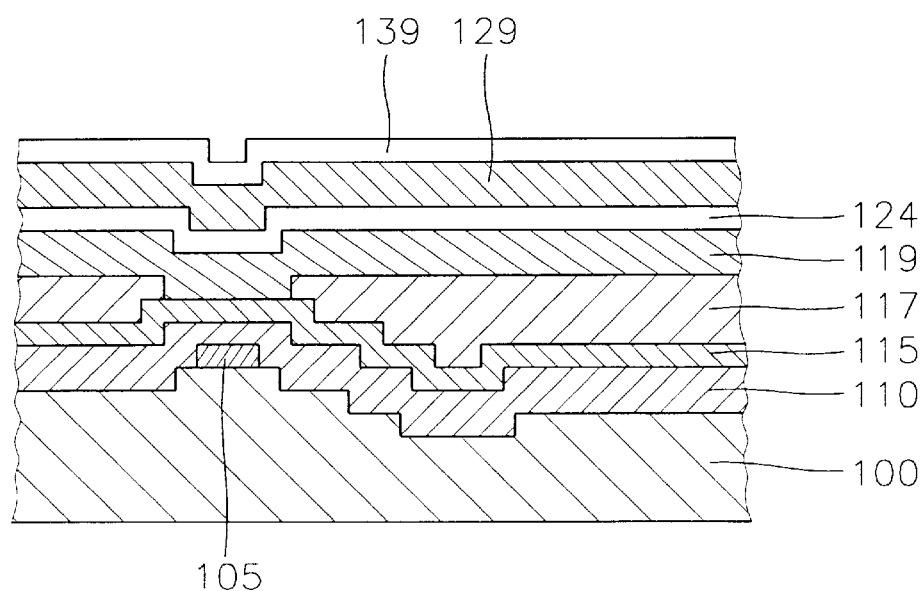

Referring to FIG. 8, a first layer 119 is formed on the first and second portions of the etch stop layer 115 and on the sacrificial layer 117. The first layer 119 is formed by using a rigid material, for example a nitride or a metal. The first layer 119 is formed by a LPCVD method so that the first layer 119 has a thickness of between about 0.1 $\mu$m and 1.0 $\mu$m. The first layer 119 will be patterned so as to form the supporting layer 120.

A bottom electrode layer 124 is overlayed on the first layer 119. The bottom electrode layer 124 is formed by using an electrically conductive metal such as platinum (Pt), tantalum (Ta), or platinum-tantalum (Pt—Ta). The bottom electrode layer 124 is formed by a sputtering method or a CVD method so that the bottom electrode layer 124 has a thickness of between about 0.1 $\mu$m and 1.0 $\mu$m. The bottom electrode layer 124 will be patterned so as to form the first bottom electrode 125.

A second layer 129 is overlayed on the bottom electrode layer 124. The second layer 129 is formed by using a piezoelectric material such as PZT (Pb(Zr, Ti)O$_3$) or PLZT ((Pb, La)(Zr, Ti)O$_3$) so that the second layer 129 has a thickness of between about 0.1 $\mu$m and 1.0 $\mu$m. Preferably, the second layer 129 has a thickness of 0.4 $\mu$m. Also, the second layer 129 is formed by using an electrostrictive material such as PMN (Pb(Mg, Nb)O$_3$). After the second layer 129 is formed by a Sol-Gel method, a sputtering method, or a CVD method, the second layer 129 is annealed by a Rapid Thermal Annealing (RTA) method. Then, the second layer 129 is polled. The second layer 129 will be patterned so as to form the active layer 130.

A top electrode layer 139 is overlayed on the second layer 129. The top electrode layer 139 is formed by using an electrically conductive and reflective metal, for example aluminum (Al), platinum, or silver (Ag). The top electrode layer 139 is formed by a sputtering method or a CVD method so that the top electrode layer 139 has a thickness of between about 0.1 $\mu$m and 1.0 $\mu$m. The top electrode layer 139 will be patterned so as to form the top electrode 140.

Figure 9A:
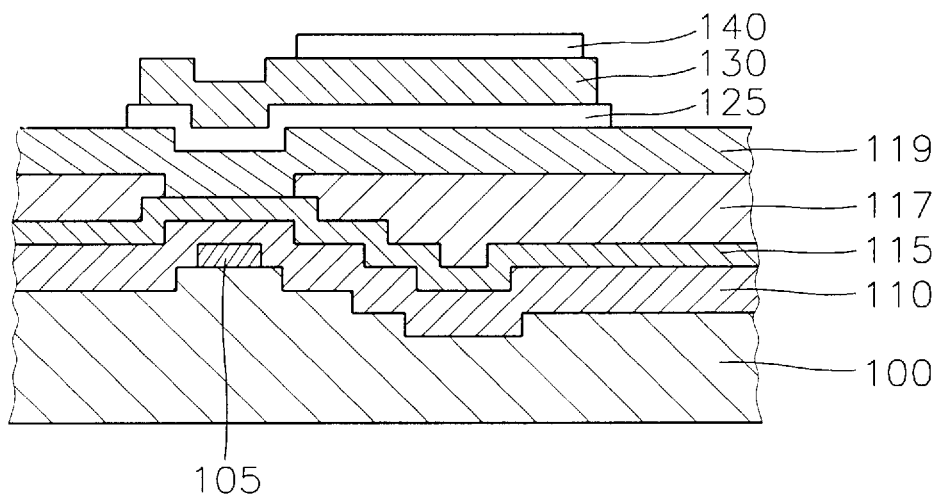
Figure 9B:
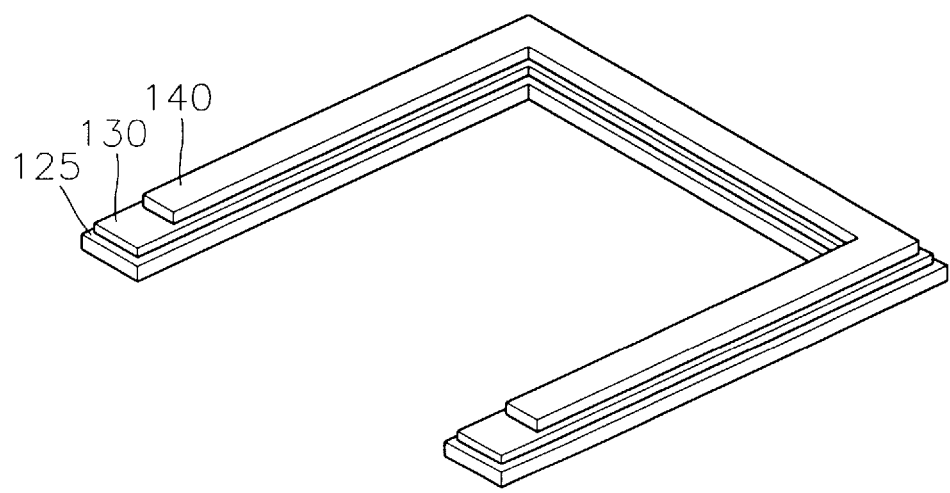

FIG. 9A illustrates a state in which the top electrode layer 139, the second layer 129, and the bottom electrode layer 124 are patterned, and FIG. 9B is a partially perspective view of FIG. 9A.

Referring to FIG. 9A and FIG. 9B, after a first photo resist (not shown) is coated on the top electrode layer 139 by a spin coating method, the top electrode layer 139 is patterned so as to from the top electrode 140 by using the first photo resist as an etching mask. As a result, the top electrode 140 has a U-shape. A second signal, that is, a bias current signal, is applied to the top electrode 140 for generating an electric field between the top electrode 140 and the bottom electrode 125. A second photo resist (not shown) is coated on the top electrode 140 and on the second layer 129 by a spin coating method after the first photo resist is removed by etching. The second layer 129 is patterned so as to form the active layer 130 by using the second photo resist as an etching mask. The active layer 130 has a U-shape which is wider than that of the top electrode 140. A third photo resist (not shown) is coated on the top electrode 140, on the active layer 130, and on the bottom electrode layer 124 by a spin coating method after the second photo resist is removed by etching. The bottom electrode layer 124 is patterned so as to form the bottom electrode 125 by using the third photo resist as an etching mask. The bottom electrode 125 has a U-shape which is wider than that of the active layer 130. Then, the third photo resist is removed by etching. Hence, when the first signal is applied to the bottom electrode 125 and the second signal is applied to the top electrode 140, the electric field is generated between the top electrode 140 and the bottom electrode 125, so the active layer 130 is deformed by the electric field.

Figure 10A:
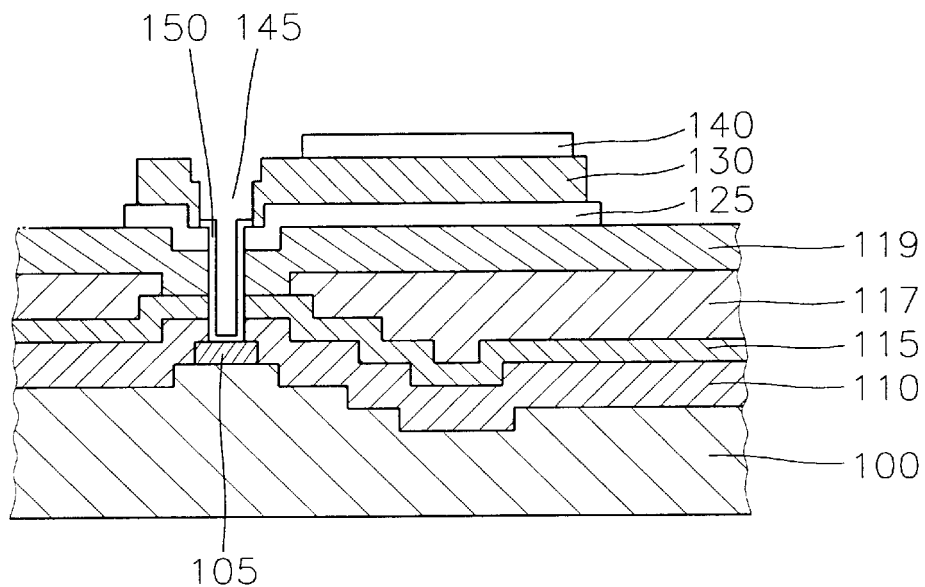
Figure 10B:
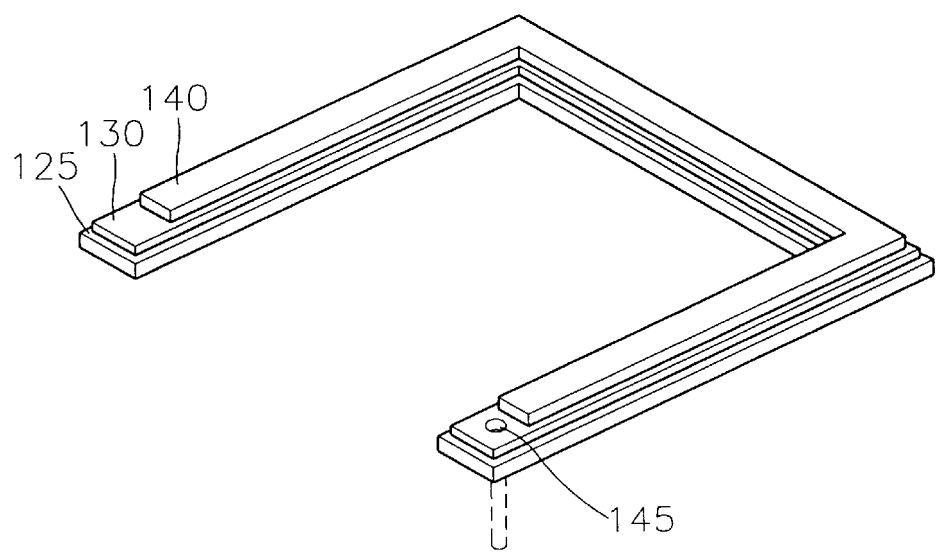

FIG. 10A illustrates a state in which the via contact 150 is formed, and FIG. 10B is a partially perspective view of FIG. 10A.

Referring to FIGS. 10A and 10B, portions of the active layer 130, the bottom electrode 125, the first layer 119, the etch stop layer 115, and the passivation layer 110 are etched so as to form the via hole 145 from the portion of the active layer 130 to the connecting terminal 105. The via contact 150 is formed in the via hole 145 by using an electrically conductive material such as tungsten (W), platinum, aluminum, or titanium. The via contact 150 is formed by a sputtering method or a CVD method so that the via contact 150 is formed from the connecting terminal 105 to the bottom electrode 125. The via contact 150 connects the bottom electrode 125 to the connecting terminal 105. Hence, the first signal is applied to the bottom electrode 125 from outside through the electrical wiring, the connecting terminal 105, and the via contact 150. At the same time, when the second signal is applied to the top electrode 140 from a common line (not shown), the electric field is generated between the top electrode 140 and the bottom electrode 125. The active layer 130 formed between the top electrode 140 and the bottom electrode 125 is deformed by the electric field.

Figure 11A:
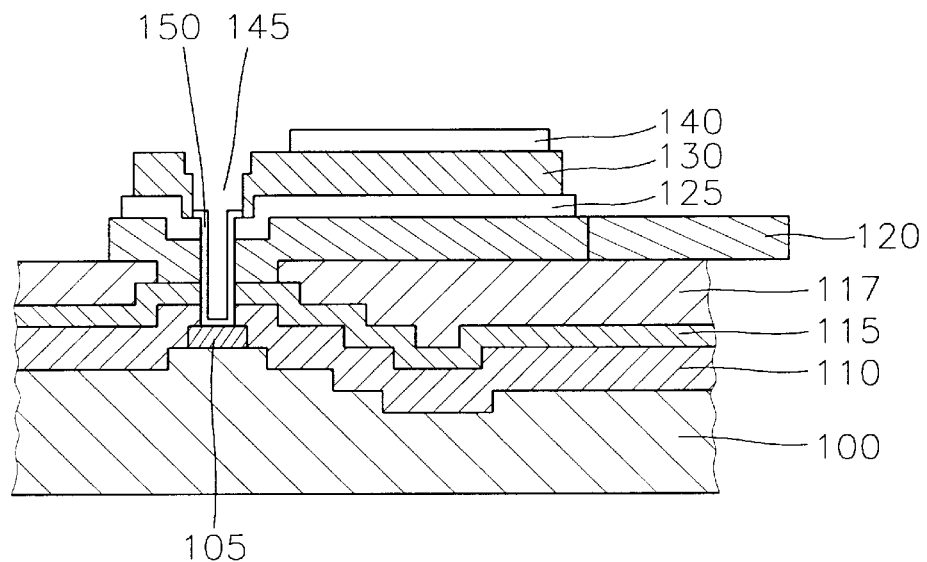
Figure 11B:
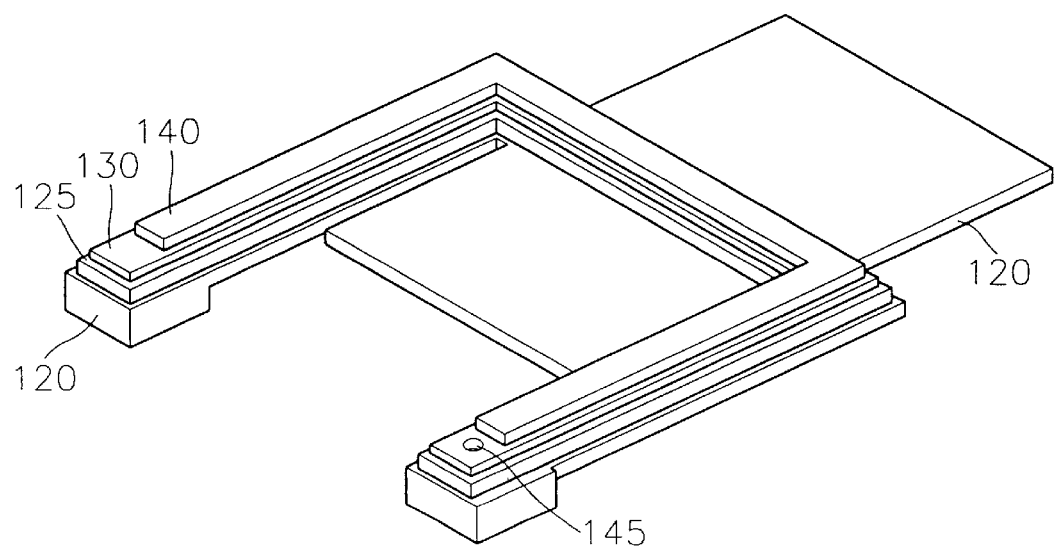

FIG. 11A illustrates a state in which the first layer 119 is patterned, and FIG. 11B is a partially perspective view of FIG. 11A.

Referring to FIGS. 11A and 11B, the first layer 119 is patterned so as to form the supporting layer 120 by using a fourth photo resist (not shown) as an etching mask after the photo resist is coated on the bottom electrode 125 and on the via hole 145 by a spin coating method. The supporting layer 120 has the lateral borders and the central portion. Bottoms of the lateral borders of the supporting layer 120 are partially attached on the substrate 100. The lateral borders of the supporting layer 120 are formed parallel to and above the etch stop layer 115 from the attached portions. The central portion of the supporting layer 120 is integrally formed with the lateral borders between the lateral borders. The central portion of the supporting layer 120 has a rectangular shape. Then, the fourth photo resist is removed by etching. A portion of sacrificial layer 117 is exposed after the first layer 119 is patterned.

Figure 12A:
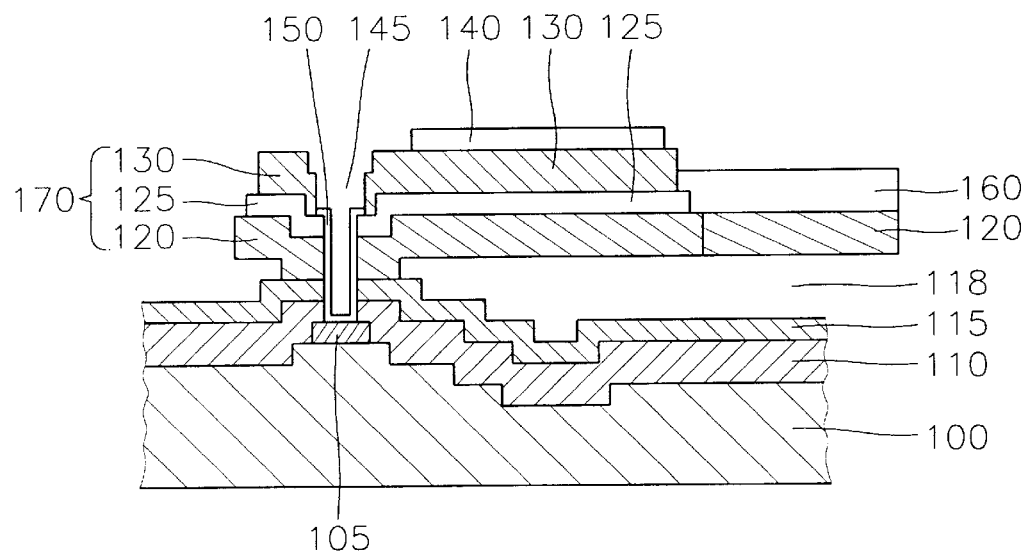
Figure 12B:
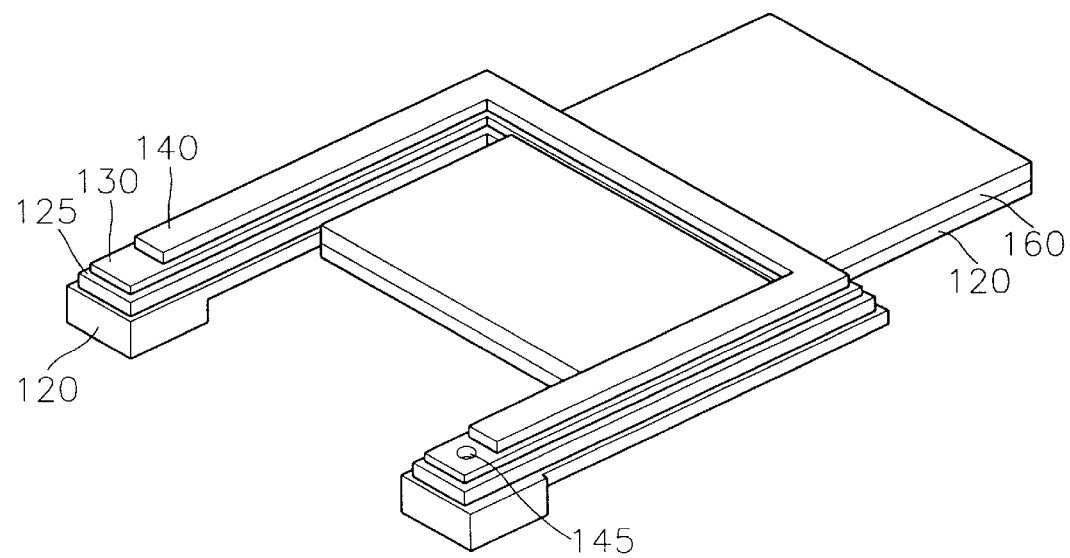

FIG. 12A illustrates a state in which the reflecting member 160 is formed on the central portion of the supporting layer 120, and FIG. 12B is a partially perspective view of FIG. 12A.

Referring to FIGS. 12A and 12B, after a fifth photo resist (not shown) is coated on the exposed portion of the sacrificial layer 117 and on the supporting layer 120 by a spin coating method, the fifth photo resist is patterned in order to expose the central portion of the supporting layer 120. The reflecting member 160 is formed on the central portion of the supporting layer 120 by using a reflective material such as silver, platinum, or aluminum. The reflecting member 160 is formed by a sputtering method or a CVD method so that the reflecting member 190 has a thickness of between 0.3 $\mu$m and 2.0 $\mu$m. The reflecting member 160 has the same shape as that of the central portion of the supporting layer 120 and reflects the incident light from a light source (not shown). Subsequently, the fifth photo resist and the sacrificial layer 117 are removed by using a vapor of hydrogen fluoride (HF), so the actuator 170 is complete. When the sacrificial layer 117 is removed, the air gap 118 is formed where the sacrificial layer 117 is positioned.

After the substrate 100 having the actuator 170 is rinsed and dried, an ohmic contact (not shown) is formed on the bottom of the substrate 100 by using chrome (Cr), nickel (Ni), or gold (Au). The ohmic contact is formed by a sputtering method or a evaporation method. The substrate 100 is cut to prepare for tape carrier package (TCP) bonding in order to apply the first signal to the bottom electrode 125 and to apply the second signal to the top electrode 140. In this case, the substrate 100 is cut to a predetermined depth in order to prepare for subsequent manufacturing steps. A panel pad (not shown) of the thin film AMA and a pad of TCP (not shown) are connected so that the thin film AMA module is complete.

The operation of the thin film AMA in an optical projection system according to the first embodiment of the present invention will be described.

In the thin film AMA according to the present embodiment, the first signal is applied from the pad of TCP to the bottom electrode 125 via the panel pad of AMA, the electrical wiring, the connecting terminal 105, and the via contact 150. At the same time, the second signal is applied from the pad of TCP to the top electrode 140 via the panel pad of AMA and the common line. Thus, an electric field is generated between the top electrode 140 and the bottom electrode 125. The active layer 130 formed between the top electrode 140 and the bottom electrode 125 is deformed by the electric field. The active layer 130 is deformed in the direction perpendicular to the electric field. The actuator 170 having the active layer 130 is actuated in the opponent direction to the position where the supporting layer 120 is positioned. That is, the actuator 170 having the active layer 130 is actuated upward, and the supporting layer 120 attached to bottom electrode 125 is also actuated upward according to the tilting of the actuator 170.

The reflecting member 160 is formed on the central portion of the supporting layer 120. The reflecting member 160 reflecting the incident light from the light source is tilted with the actuator 170. Hence, the reflecting member 160 reflects the light onto the screen, so the picture is formed on the screen.

Embodiment 2

Figure 13:
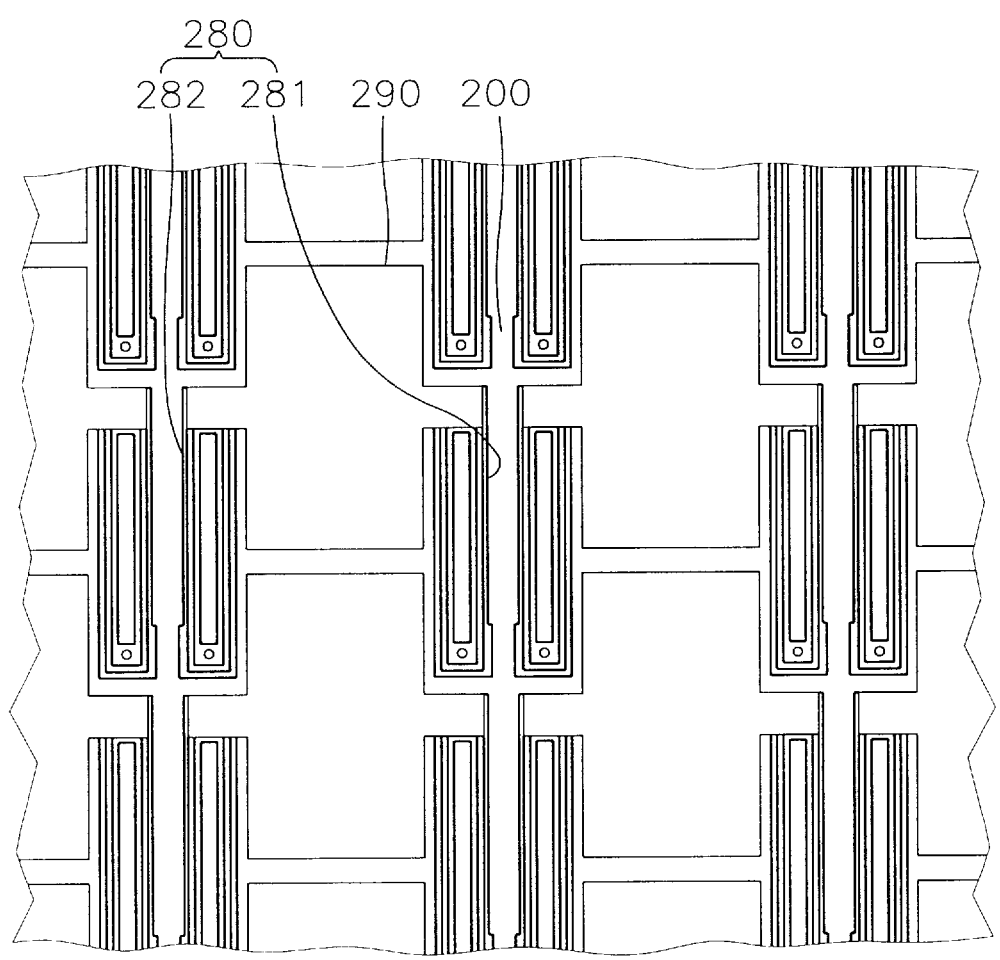
FIG. 13 is a plan view for showing a thin film actuated mirror array in an optical projection system according to a second embodiment of the present invention.
Figure 14:
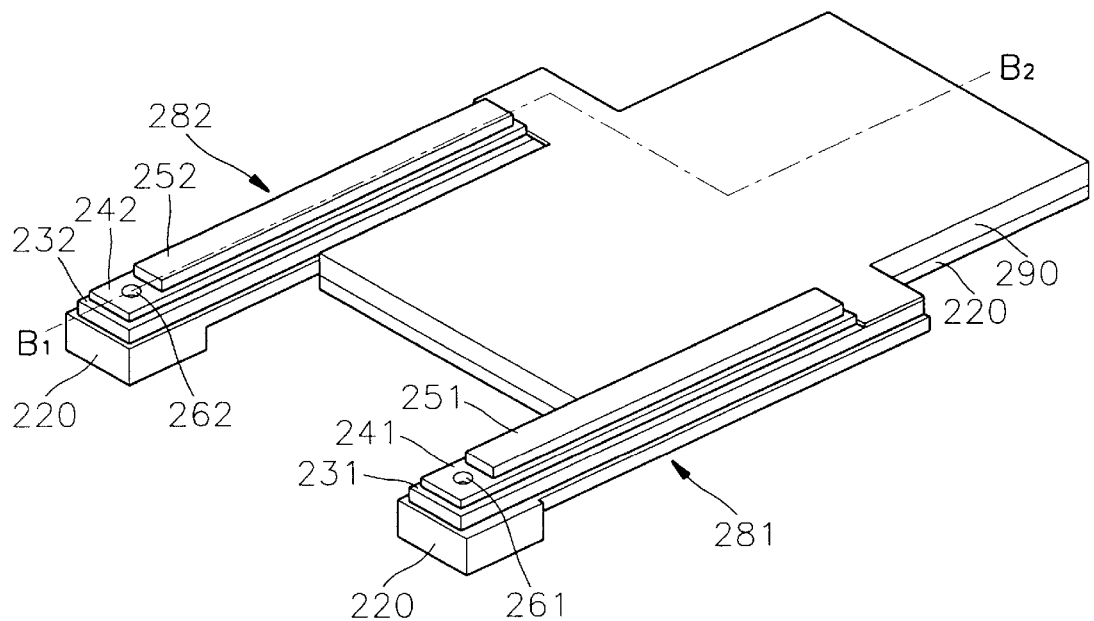
FIG. 14 is a perspective view for showing the thin film actuated mirror array in an optical projection system in FIG. 13.
Figure 15:
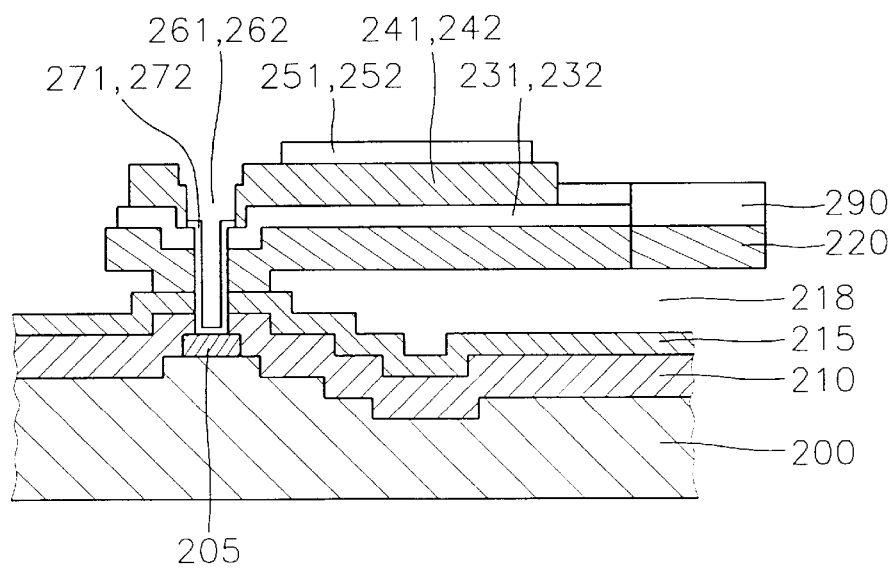
FIG. 15 is a cross-sectional view taken along line $B_1$–$B_2$ of FIG. 14.

FIG. 13 is a plan view for showing a thin film actuated mirror array in an optical projection system according to a second embodiment of the present invention, FIG. 14 is a perspective view for showing the thin film actuated mirror array in an optical projection system in FIG. 13, and FIG. 15 is a cross-sectional view taken along line $B_1$–$B_2$ of FIG. 14.

Referring to FIG. 13, the thin film AMA according to the present embodiment has a substrate 200, an actuator 280 formed on the substrate 200, and a reflecting member 290 installed on the actuator 280.

The actuator 280 has a first actuating part 281 formed on a first portion of the substrate 200 and a second actuating part 282 formed on a second portion of the substrate 200. The reflecting member 290 is formed between the first actuating part 281 and the second actuating part 282.

Referring to FIGS. 14 and 15, the substrate 200, in which electrical wiring (not shown) is installed, has a connecting terminal 205 formed on the electrical wiring, a passivation layer 210 overlayed on the substrate 200 and on the connecting terminal 205, and an etch stop layer 215 overlayed on the passivation layer 21.

Bottoms of both lateral borders of the supporting layer 220 are partially attached to the substrate 200. The lateral borders of the supporting layer 220 are formed parallel to each other from the attached portions. A central portion of the supporting layer 220 is integrally formed with the lateral borders between the lateral borders. The central portion of the supporting layer 220 has a rectangular shape. An air gap 218 is interposed between the etch stop layer 215 and the supporting layer 220. The first actuating part 281 is formed on a first lateral border of the supporting layer 220, and the second actuating part 282 is formed on a second lateral portion of the supporting layer 220.

The first actuating part 281 and the second actuating portion 282 are formed parallel to each other on the supporting layer 220. The first actuating part 281 has a first bottom electrode 231 formed on the first lateral border of supporting layer 220, a first active layer 241 formed on the first bottom electrode 231, and a first top electrode 251 formed on the first active layer 241. A first via contact 271 is formed in a first via hole 261 which is formed from a portion of the first active layer 241 to the connecting terminal 205 through the first bottom electrode 231, the first lateral border of the supporting layer 220, the etch stop layer 215, and the passivation layer 210.

The second actuating part 282 has the same shape as that of the first actuating part 281. The second actuating part 282 has a second bottom electrode 232 formed on the second lateral border of the supporting layer 220, a second active layer 242 formed on the second bottom electrode 232, and a second top electrode 252 formed on the second active layer 242. A second via contact 272 is formed in a second via hole 262 which is formed from a portion of the second active layer 242 to the connecting terminal 205 through the second bottom electrode 232, the second lateral border of the supporting layer 220, the etch stop layer 215, and the passivation layer 210.

The first bottom electrode 231 and the second bottom electrode 232 are respectively formed on the first and the second lateral borders of supporting layer 220. That is, the lateral borders of supporting layer 220 are respectively attached beneath the first bottom electrode 231 and the second bottom electrode 232, and the central portion of the supporting layer 220 is exposed out of the first bottom electrode 231 and the second bottom electrode 232. The first bottom electrode 231 and the second bottom electrode 232 are formed parallel to each other. The first active layer 241 and the second active layer 242 are respectively formed on the first bottom electrode 231 and on the second bottom electrode 232. The first top electrode 251 and the second top electrode 252 are also respectively formed on the first active layer 241 and on the second active layer 242. The first active layer 241 is smaller than the first bottom electrode 231 and the second active layer 242 is smaller than the second bottom electrode 232. The first top electrode 251 is smaller than the first active layer 241 and the second top electrode 252 is smaller than the second active layer 242.

The reflecting member 290 for reflecting an incident light from a light source (not shown) is formed on the central portion of the supporting layer 220. Preferably, the reflecting member 290 has a rectangular shape and the reflecting member 290 is a mirror.

A method for manufacturing the thin film AMA in an optical projection system according to the second embodiment of the present invention will be described as follows.

FIGS. 16 to 20B illustrate manufacturing steps of the thin film AMA according to the present embodiment.

Figure 16:
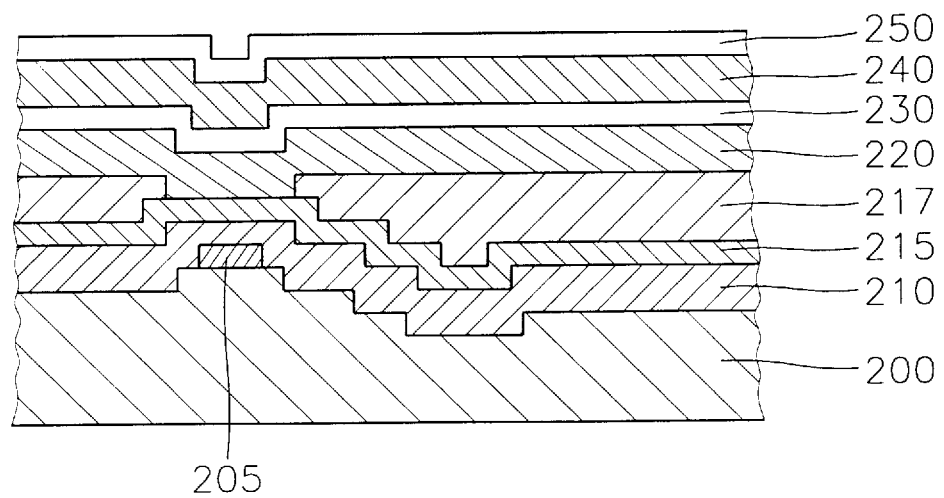
FIGS. 16 to 20B illustrate manufacturing steps of the thin film actuated mirror array in an optical projection system according to the second embodiment of the present invention.

Referring to FIG. 16, the passivation layer 210 is overlayed on the substrate 200 having the electrical wiring (not shown) and the connecting terminal 205 formed on the electrical wiring. The electrical wiring and the connecting terminal 205 receive a first signal from outside and transmit the first signal to the first bottom electrode 231 and the second bottom electrode 232. The first signal is a picture current signal. Preferably, the electrical wiring has a MOS transistor for switching operation. The passivation layer 210 is formed by using PSG so that the passivation layer 210 has a thickness of between about 0.1 µm and 1.0 µm. The passivation layer 210 is formed by a CVD method. The passivation layer 210 protects the substrate 200 having the electrical wiring and the connecting terminal 205 during successive manufacturing steps.

The etch stop layer 215 is overlayed on the passivation layer 210 by using a nitride so that the etch stop layer 215 has a thickness of between about 1000 Å and 2000 Å. The etch stop layer 215 is formed by a LPCVD method. The etch stop layer 215 protects the passivation layer 210 and the substrate 200 during subsequent etching steps.

A sacrificial layer 217 is overlayed on the etch stop layer 215 by using PSG. The sacrificial layer 217 is formed by a APCVD method so that the sacrificial layer 217 has a thickness of between about 0.5 µm and 4.0 µm. In this case, the degree of flatness of the sacrificial layer 217 is poor because the sacrificial layer 217 covers the top of the substrate 200 having the electrical wiring and the connecting terminal 205. Therefore, the surface of the sacrificial layer 217 is planarized by using a SOG or by a CMP method. Subsequently, a first portion and a second portion of the sacrificial layer 217 having the connecting terminal 205 formed thereunder are patterned in order to expose a first portion and a second portion of the etch stop layer 215 having the connecting terminal 205 formed thereunder with respect to form the supporting layer 220.

A first layer 219 is formed on the first and second portions of the etch stop layer 215 and on the sacrificial layer 217. The first layer 219 is formed by using a rigid material, for example a nitride or a metal. The first layer 219 is formed by a LPCVD method so that the first layer 219 has a thickness of between about 0.1 µm and 1.0 µm. The first layer 219 will be patterned so as to form the supporting layer 220.

A bottom electrode layer 230 is overlayed on the first layer 219. The bottom electrode layer 230 is formed by using an electrically conductive metal such as platinum, tantalum, or platinum-tantalum. The bottom electrode layer 230 is formed by a sputtering method or a CVD method so that the bottom electrode layer 230 has a thickness of between about 0.1 µm and 1.0 µm. The bottom electrode layer 230 will be patterned so as to form the first bottom electrode 231 and the second bottom electrode 232.

An active layer 240 is overlayed on the bottom electrode layer 230. The active layer 240 is formed by using a piezoelectric material such as PZT (Pb(Zr, Ti)O$_3$) or PLZT ((Pb, La)(Zr, Ti)O$_3$) so that the active layer 240 has a thickness of between about 0.1 µm and 1.0 µm. Preferably, the active layer 240 has a thickness of 0.4 µm. Also, the active layer 240 is formed by using an electrostrictive material such as PMN (Pb(Mg, Nb)O$_3$). After the active layer 240 is formed by a Sol-Gel method, a sputtering method, or a CVD method, the active layer 240 is annealed by a RTA method. Then, the active layer 240 is polled. The active layer 240 will be patterned so as to form the first active layer 241 and the second active layer 242.

A top electrode layer 250 is overlayed on the active layer 240. The top electrode layer 250 is formed by using an electrically conductive and reflective metal, for example aluminum, platinum, or silver. The top electrode layer 250 is formed by a sputtering method or a CVD method so that the top electrode layer 250 has a thickness of between about 0.1 $\mu$m and 1.0 $\mu$m. The top electrode layer 250 will be patterned so as to form the first top electrode 251 and the second top electrode 252.

Figure 17A:
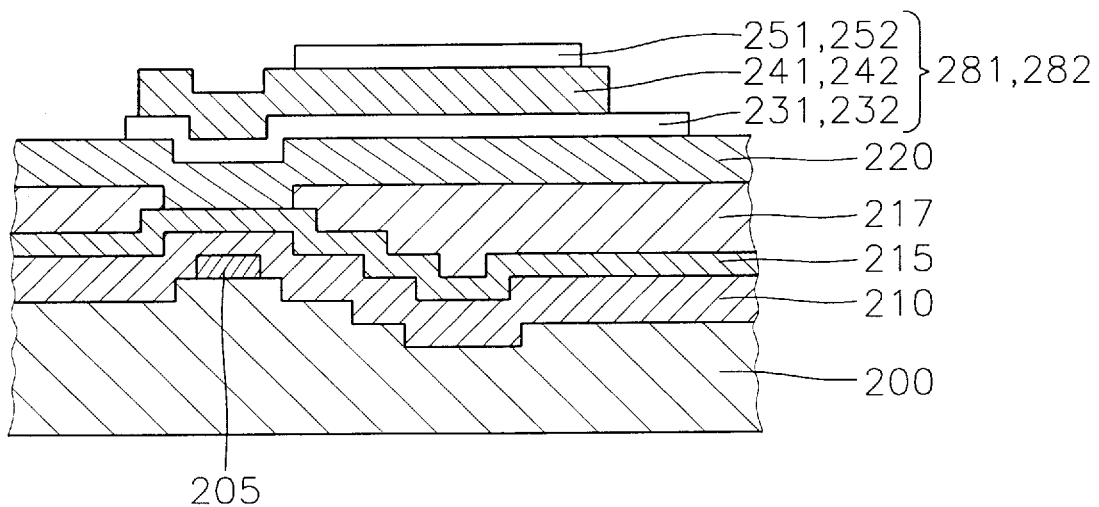
Figure 17B:
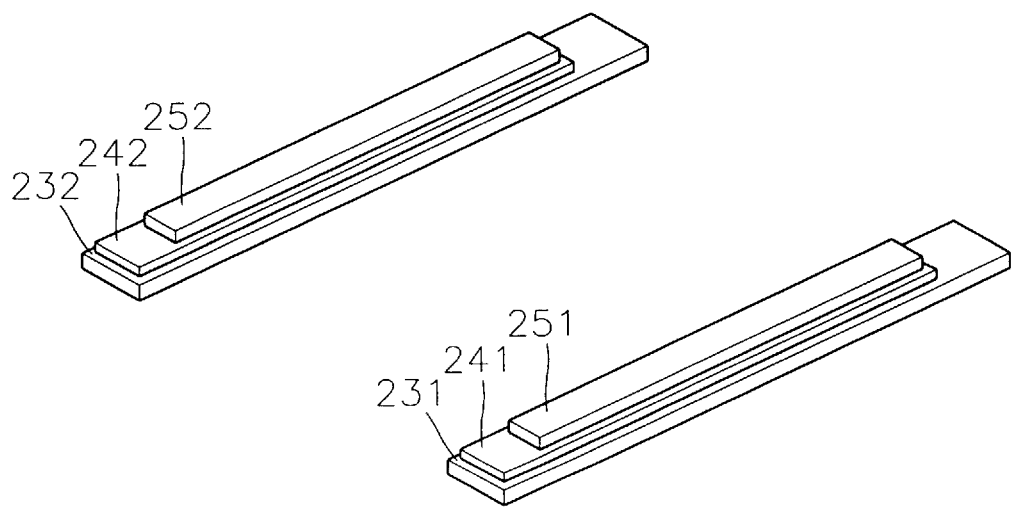

FIG. 17A illustrates a state in which the top electrode layer 250, the active layer 240, and the bottom electrode layer 230 are patterned, and FIG. 17B is a partially perspective view of FIG. 17A.

Referring to FIGS. 17A and 17B, after a first photo resist (not shown) is coated on the top electrode layer 250 by a spin coating method, the top electrode layer 250 is patterned so as to form the first top electrode 251 and the second top electrode 252 by using the first photo resist as an etching mask. The first top electrode 251 and the second top electrode 252 are formed parallel to each other. A second signal is applied to the first top electrode 251 and to the second top electrode 252 from a common line (not shown). The second signal is a bias current signal. A second photo resist (not shown) is coated on the first top electrode 251, on the second top electrode 252, and on the active layer 240 by a spin coating method after the first photo resist is removed by etching. The active layer 240 is patterned so as to form the first active layer 241 and the second active layer 242 by using the second photo resist as an etching mask. The first active layer 241 and the second active layer 242 are respectively wider than the first top electrode 251 and the second top electrode 252.

A third photo resist (not shown) is coated on the first top electrode 251, on the second top electrode 252, on the first active layer 241, on the second active layer 242, and on the bottom electrode layer 230 by a spin coating method after the second photo resist is removed by etching. The bottom electrode layer 230 is patterned so as to form the first bottom electrode 231 and the second bottom electrode 232 by using the third photo resist as an etching mask. The first bottom electrode 231 and the second bottom electrode 232 are respectively wider than the first active layer 241 and the second active layer 242. Then, the third photo resist is removed by etching. When the first signal is applied to the first bottom electrode 231 and to the second bottom electrode 232 and the second signal is applied to the first top electrode 251 and to the second signal 252, electric fields are respectively generated between the first top electrode 251 and the first top bottom electrode 231, and between the second top electrode 252 and the second bottom electrode 232. The first active layer 241 and the second active layer 242 are respectively deformed by the electric fields.

Figure 18A:
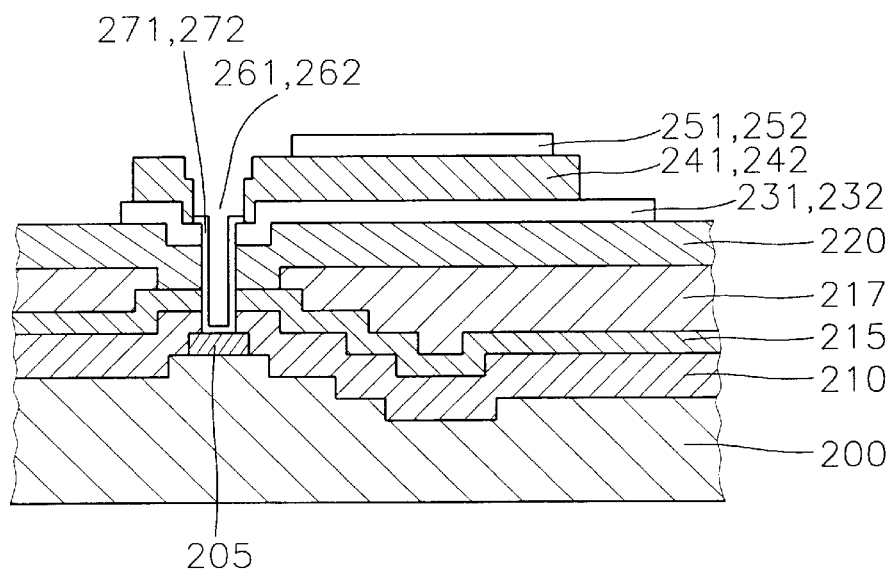
Figure 18B:
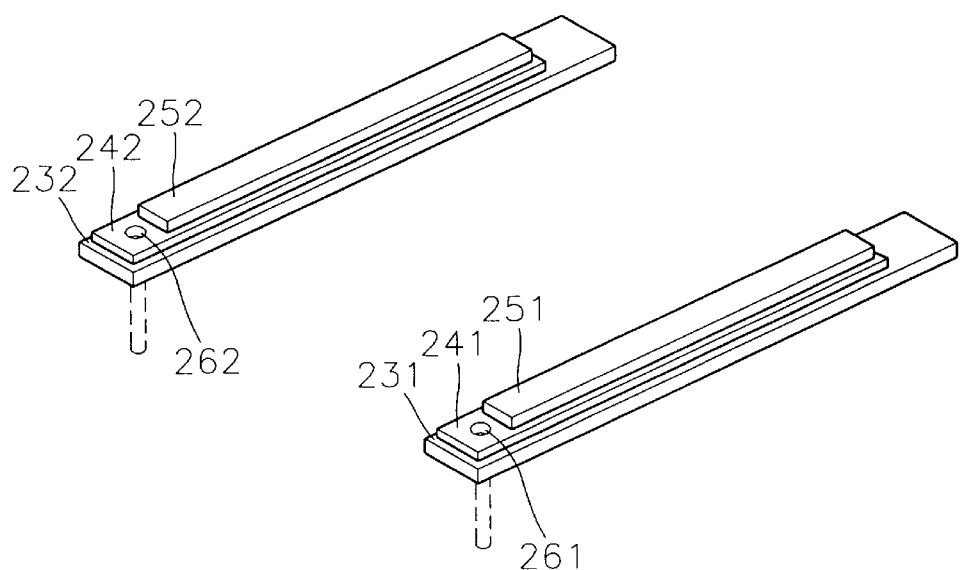

FIG. 18A illustrates a state in which the first via contact 271 and the second via contact 272 are formed, and FIG. 18B is a partially perspective view of FIG. 18A.

Referring to FIGS. 18A and 18B, portions of the first active layer 241, the fist bottom electrode 231, the first layer 219, the etch stop layer 215, and the passivation layer 210 are etched so as to form the first via hole 261 from the portion of the first active layer 241 to the connecting terminal 205. At the same time, portions of the second active layer 242, the second bottom electrode 232, the first layer 219, the etch stop layer 215, and the passivation layer 210 are etched so as to form the second via hole 262 from the portion of the second active layer 242 to the connecting terminal 205. The first via contact 271 and the second via contact 272 are respectively formed in the first via hole 261 and the second via hole 262 by using an electrically conductive metal such as tungsten, platinum, aluminum, or titanium. The first via contact 271 and the second via contact 272 are formed by a sputtering method or a CVD method so that the first via contact 271 and the second via contact 272 are respectively formed from the connecting terminal 205 to the first bottom electrode 231 and to the second bottom electrode 232. The first via contact 271 connects the first bottom electrode 231 to the connecting terminal 205. The second via contact 272 connects the second bottom electrode 232 to the connecting terminal 205. Hence, the first signal is applied to the first bottom electrode 231 from outside through the electrical wiring, the connecting terminal 205, and the first via contact 271. Also, the first signal is applied to the second bottom electrode 232 from outside through the electrical wiring, the connecting terminal 205, and the second via contact 272. At the same time, when the second signal is applied from a common line to the first top electrode 251 and to the second top electrode 252, the electric fields are respectively generated between the first top electrode 251 and the first bottom electrode 232 and between the second top electrode 252 and the second bottom electrode 232. The first active layer 241 formed between the first top electrode 251 and the first bottom electrode 231 and the second active layer 242 formed between the second top electrode 252 and the second bottom electrode 232 are deformed by the electric fields.

Figure 19A:
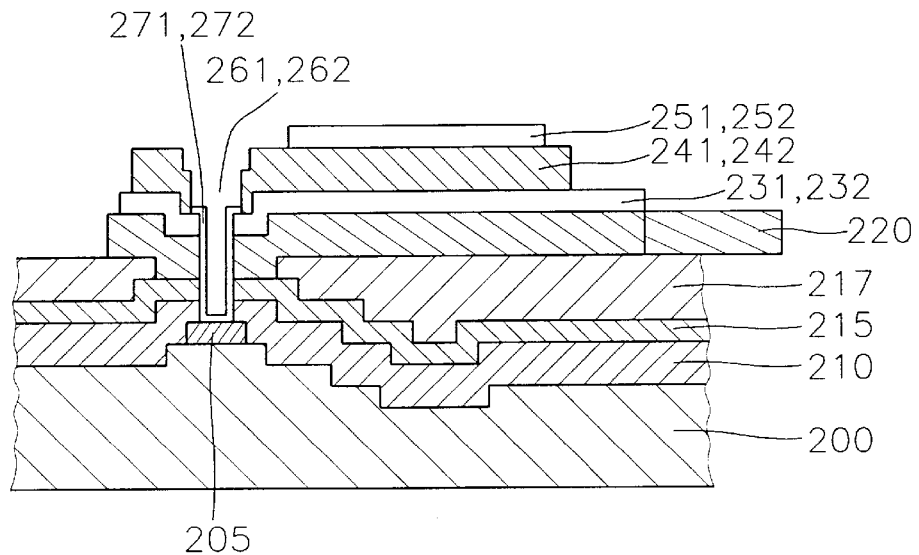
Figure 19B:
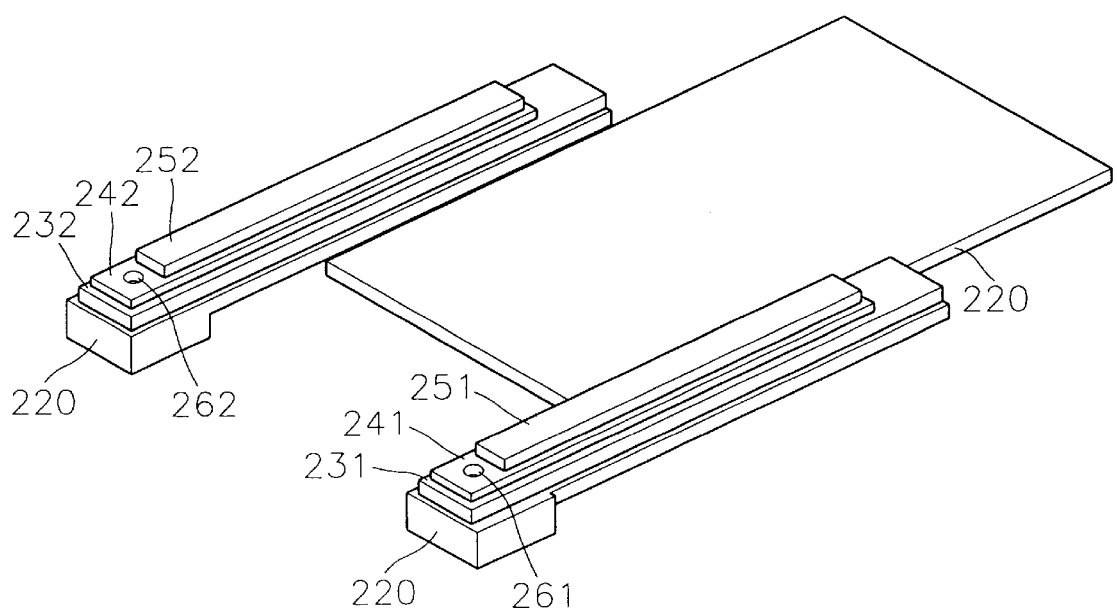

FIG. 19A illustrates a state in which the first layer 219 is patterned and FIG. 19B is a partially perspective view of FIG. 19A.

Referring to FIGS. 19A and 19B, the first layer 219 is patterned so as to form the supporting layer 220 by using a fourth photo resist (not shown) as an etching mask after the fourth photo resist is coated on the first bottom electrode 231, on the second bottom electrode 232, on the first via hole 262, and on the second via hole 262 by a spin coating method. The supporting layer 220 has the lateral borders and the central portion. Bottoms of both the lateral borders of the supporting layer 220 are partially attached to the substrate 200. The lateral borders of the supporting layer 220 are formed parallel to each other from the attached portions. The central portion of the supporting layer 220 is integrally formed with the lateral borders between the lateral borders. The lateral borders are respectively wider than the first bottom electrode 231 and the second bottom electrode 232. The central portion of the supporting layer 220 has a rectangular shape. That is, the central portion of the supporting layer 220 is exposed out of the first bottom electrode 231 and the second bottom electrode 232. Then, the fourth photo resist is removed by etching. A portion of sacrificial layer 217 is exposed after the first layer 219 is patterned.

Figure 20A:
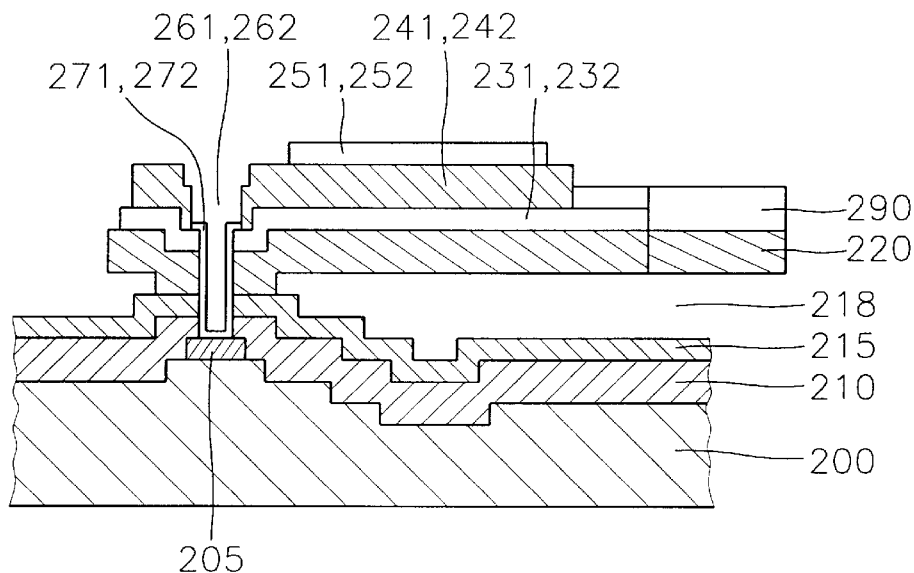
Figure 20B:
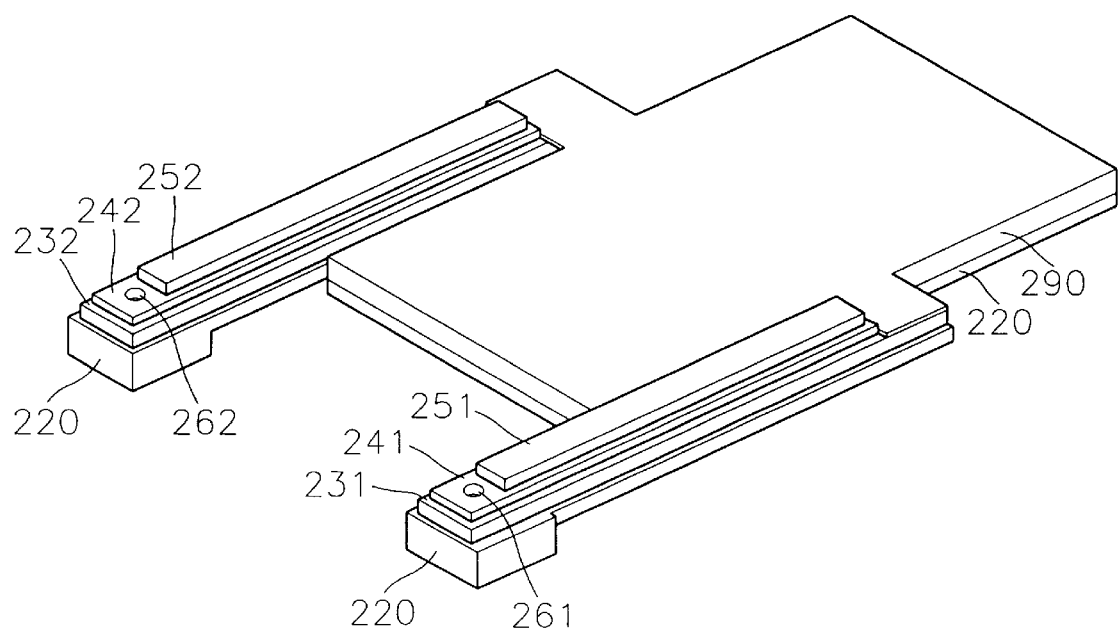

FIG. 20A illustrates a state in which the reflecting member 290 is formed on the central portion of the supporting layer 220, and FIG. 20B is a partially perspective view of FIG. 20A.

Referring to FIGS. 20A and 20B, after a fifth photo resist (not shown) is coated on the exposed portion of the sacrificial layer 217 and on the supporting layer 220 by a spin coating method, the fifth photo resist is patterned in order to expose the central portion of the supporting layer 220, a first portion of the first bottom electrode 231, and a first portion of the second bottom electrode 232. The reflecting member 290 is formed on the central portion of the supporting layer 220, on the first portion of the first bottom electrode 231, and on the first portion of the second bottom electrode 232 by using an electrically conductive and reflective metal such as silver, platinum, or aluminum. The reflecting member 290 is formed by a sputtering method or a CVD method so that the reflecting member 290 has a thickness of between 0.3 μm and 2.0 μm. The reflecting member 290 has the same shape that of the central portion of the supporting layer 220 and reflects the incident light from a light source (not shown). Subsequently, the fifth photo resist and the sacrificial layer 217 are removed by using a vapor of hydrogen fluoride (HF), so the actuator 280 is complete. When the sacrificial layer 217 is removed, the air gap 218 is formed where the sacrificial layer 217 is positioned.

After the substrate 200 having the actuator 280 is rinsed and dried, an ohmic contact (not shown) is formed on the bottom of the substrate 200 by using chrome, nickel, or gold. The ohmic contact is formed by a sputtering method or an evaporation method. The substrate 200 is cut to prepare for TCP bonding in order to apply the first signal to the first bottom electrode 231 and to the second bottom electrode 232 and to apply the second signal to the first top electrode 251 and to the second top electrode 252. In this case, the substrate 200 is cut to a predetermined depth in order to prepare for subsequent manufacturing steps. A panel pad (not shown) of the thin film AMA and a pad of TCP (not shown) are connected so that a thin film AMA module is complete.

The operation of the thin film AMA in an optical projection system according to the present embodiment will be described.

In the thin film AMA according to the present embodiment, the first signal is applied from the pad of TCP to the first bottom electrode 231 through the panel pad of AMA, the electrical wiring, the connecting terminal 205, and the first via contact 271. The first signal is also applied from the pad of TCP to the second bottom electrode 232 through the panel pad of AMA, the electrical wiring, the connecting terminal 205, and the second via contact 272. At the same time, the second signal is applied from the pad of TCP to the first top electrode 251 via the panel pad of AMA and the common line. The second signal is also applied from the pad of TCP to the second top electrode 252 via the panel pad of AMA and the common line. Hence, electric fields are respectively generated between the first top electrode 251 and the first bottom electrode 231 and between the second top electrode 252 and the second bottom electrode 232. The first active layer 241 formed between the first top electrode 251 and the first bottom electrode 231 and the second active layer 242 formed between the second top electrode 252 and the second bottom electrode 232 are deformed by the electric fields. The first active layer 241 and the second active layer 242 are deformed in the directions perpendicular to electric fields. The first active layer 241 and the second active layer 242 are deformed in the directions opponent to the position of the supporting layer 220. That is, the actuator 280 having the first active layer 241 and the second active layer 242 is actuated upward and the supporting layer 220 attached to the actuator 280 is also actuated upward according to the tilting of the actuator 280.

The reflecting member 290 is formed on the central portion of the supporting layer 220. The reflecting member 290 reflecting the incident light from the light source tilts with the actuator 280. Hence, the reflecting member 290 reflects the light onto a screen, so the picture is formed on the screen.

Embodiment 3

Figure 21:
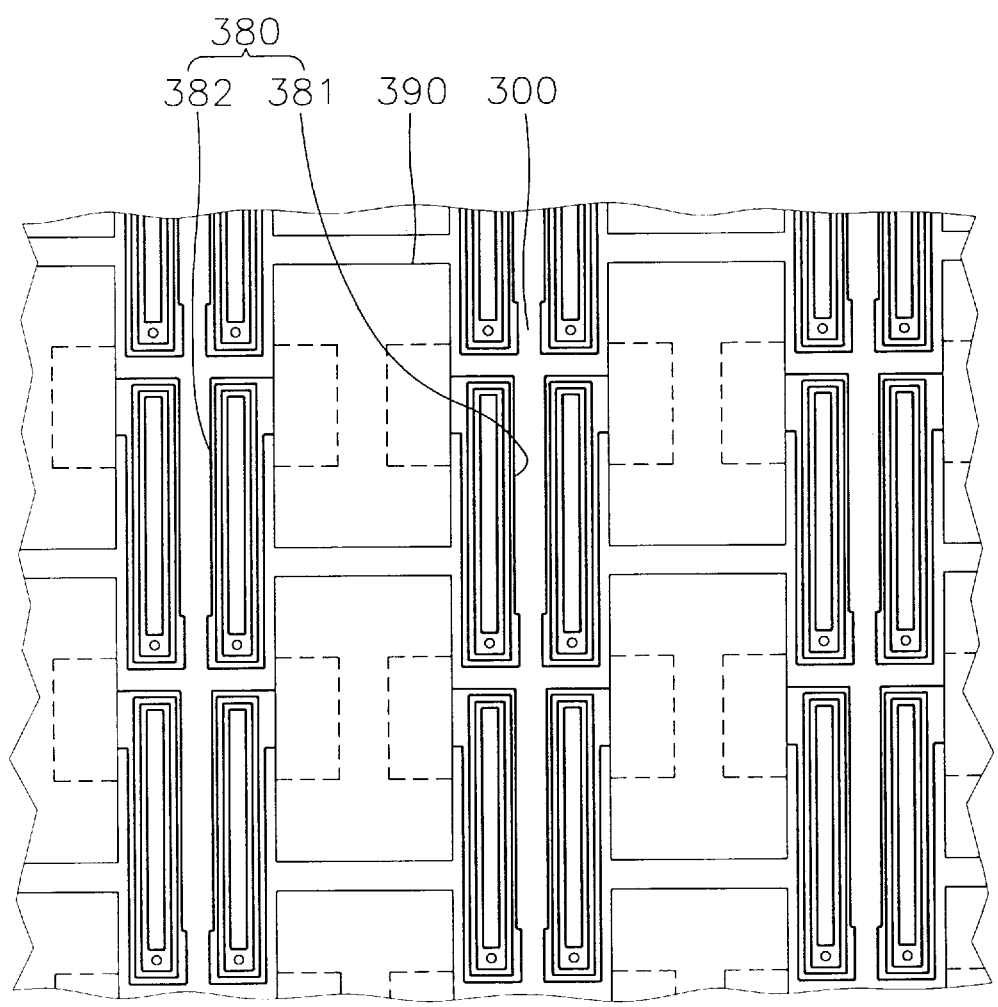
FIG. 21 is a plan view for showing a thin film actuated mirror array in an optical projection system according to a third embodiment of the present invention.
Figure 22:
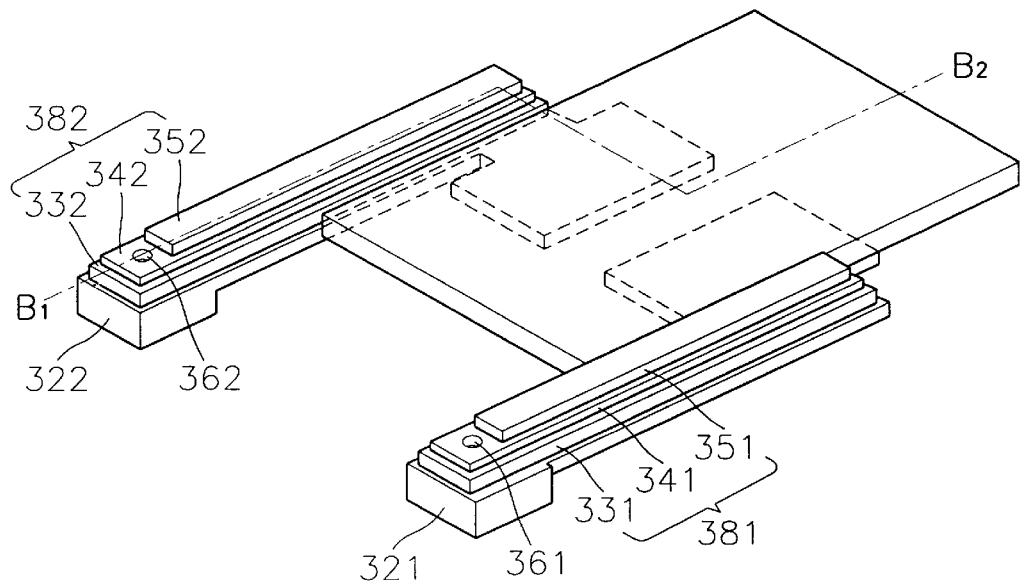
FIG. 22 is a perspective view for showing the thin film actuated mirror array in an optical projection system in FIG. 21.
Figure 23:
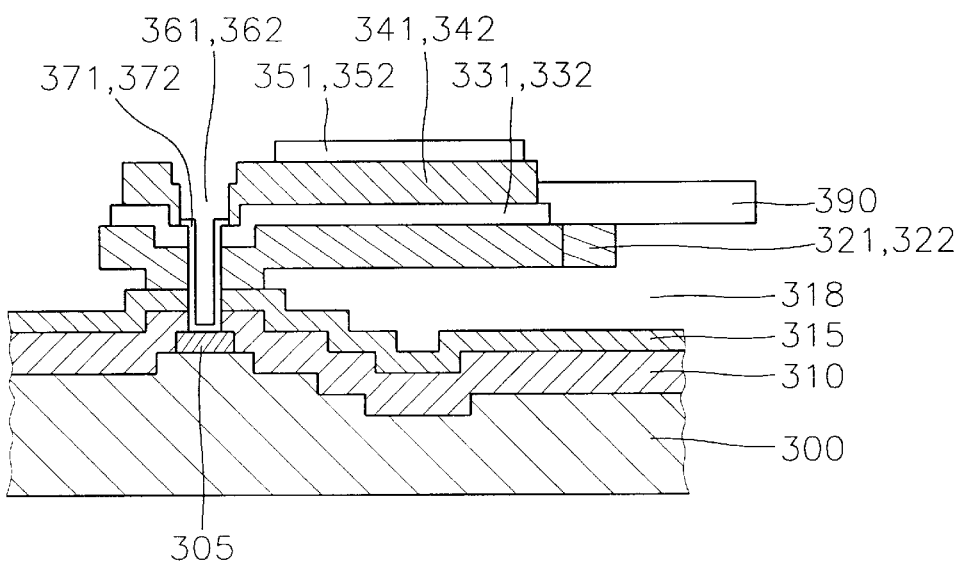
FIG. 23 is a cross-sectional view taken along line $C_1$–$C_2$ of FIG. 22.

FIG. 21 is a plan view for showing a thin film actuated mirror array in an optical projection system according to a third embodiment of the present invention, FIG. 22 is a perspective view for showing the thin film actuated mirror array in FIG. 21, and FIG. 23 is a cross-sectional view taken along line $C_1$–$C_2$ of FIG. 22.

Referring to FIG. 21, the thin film AMA according to the present embodiment has a substrate 300, an actuator 380 formed on the substrate 300, and a reflecting member 390 installed on the actuator 380.

The actuator 380 has a first actuating part 381 formed on a first portion of the substrate 300 and a second actuating part 382 formed on a second portion of the substrate 300. The reflecting member 390 is formed between the first actuating part 381 and the second actuating part 382.

Referring to FIG. 22 and FIG. 23, the substrate 300, in which electrical wiring (not shown) is installed, has a connecting terminal 305 formed on the electrical wiring, a passivation layer 310 overlayed on the substrate 300 and on the connecting terminal 305, and an etch stop layer 315 overlayed on the passivation layer 310.

A bottom of a first portion of the first supporting layer 321 is attached to first portion of the etch stop layer 315 having the connecting terminal 305 formed thereunder, and the first portion of the first supporting layer 321 is formed parallel to and above the etch stop layer 315. An air gap 318 is interposed between the etch stop layer 315 and the first portion of the first supporting layer 321. A bottom of a first portion of the second supporting layer 322 is attached to second portion of the etch stop layer 315 having the connecting terminal 305 formed thereunder, and the first portion of the second supporting layer 322 is formed parallel to and above the etch stop layer 315. The air gap 318 also is interposed between the etch stop layer 315 and the first portion of the second supporting layer 322.

The first actuating part 381 and the second actuating portion 382 are respectively formed parallel to each other on the first supporting layer 321 and on the second supporting layer 322. The first actuating part 381 has a first bottom electrode 331 formed on the first supporting layer 321, a first active layer 341 formed on the first bottom electrode 331, and a first top electrode 351 formed on the first active layer 341. A first via contact 371 is formed in a first via hole 361 which is formed from a portion of the first active layer 341 to the connecting terminal 305 through the first bottom electrode 331, the first supporting layer 321, the etch stop layer 315, and the passivation layer 310.

The second actuating part 382 has the same shape as that of the first actuating part 381. The second actuating part 382 has a second bottom electrode 332 formed on the second supporting layer 322, a second active layer 342 formed on the second bottom electrode 332, and a second top electrode 352 formed on the second active layer 342. A second via contact 372 is formed in a second via hole 362 which is formed from a portion of the second active layer 342 to the connecting terminal 205 through the second bottom electrode 232, the second supporting layer 322, the etch stop layer 315, and the passivation layer 310.

The first portion of the first supporting layer 321 and the first portion of the second supporting layer 322 are partially attached to the substrate 300. The first portion of the first supporting layer 321 and the first portion of the second supporting layer 322 are formed parallel to each other from attached portions. A second portion of the first supporting layer 321 is integrally formed with the first portion of the first supporting layer 321. The second portion of the first supporting layer 321 protruding inward has a rectangular shape. Namely, the second portion of the first supporting layer 321 is exposed out of the first bottom electrode 331. A second portion of the second supporting layer 322 is integrally formed with the first portion of the second supporting layer 322. The second portion of the second supporting layer 322 protruding inward has a rectangular shape. The first supporting layer 321 and the second supporting layer 322 have shapes that are symmetrical to each other. The second portion of the second supporting layer 322 is exposed out of the second bottom electrode 332.

The first bottom electrode 331 and the second bottom electrode 332 are respectively formed on the first portion of the first supporting layer 321 and on the first portion of the second supporting layer 322. Hence, the first bottom electrode 331 and the second bottom electrode 332 are parallelly formed. The first active layer 341 and the second active layer 342 are respectively formed on the first bottom electrode 331 and on the second bottom electrode 332. The first top electrode 351 and the second top electrode 352 are also respectively formed on the first active layer 341 and on the second active layer 342. The first active layer 341 has a smaller area than that of the first bottom electrode 331, and the second active layer 342 has a smaller area than that of the second bottom electrode 332. The first top electrode 351 has a smaller area than that of the first active layer 341, and the second top electrode 352 has a smaller area than that of the second active layer 342.

The reflecting member 390 for reflecting the incident light from a light source (not shown) is formed on the second portion of the first supporting layer 321 and on the second portion of the second supporting layer 322. Preferably, the reflecting member 390 has a rectangular shape.

In the thin film AMA according to the third embodiment of the present invention, a method for manufacturing the thin film AMA is the same as that of the second embodiment of the present invention shown in FIGS. 16 to 20B, except for patterning the first supporting layer 321 and the second supporting layer 322.

The operation of thin film AMA in an optical projection system according to the present embodiment will be described.

In the thin film AMA according to the present embodiment, the first signal is applied from the pad of TCP to the first bottom electrode 331 through the panel pad of AMA, the electrical wiring, the connecting terminal 305, and the first via contact 371. The first signal is also applied from the pad of TCP to the second bottom electrode 332 through the panel pad of AMA, the electrical wiring, the connecting terminal 305, and the second via contact 372. At the same time, the second signal is applied from the pad of TCP to the first top electrode 351 via the panel pad of AMA and the common line. The second signal is also applied from the pad of TCP to the second top electrode 352 via the panel pad of AMA and the common line. Hence, electric fields are respectively generated between the first top electrode 351 and the first bottom electrode 331 and between the second top electrode 352 and the second bottom electrode 332. The first active layer 341 formed between the first top electrode 351 and the first bottom electrode 331 and the second active layer 342 formed between the second top electrode 352 and the second bottom electrode 332 are deformed by electric fields. The first active layer 341 and the second active layer 342 are deformed in the directions perpendicular to the electric fields. The first active layer 341 and the second active layer 342 are respectively deformed in the directions opponent to positions of the first supporting layer 321 and the second supporting layer 322. That is, the actuator 380 having the first active layer 341 and the second active layer 342 is actuated upward. The first supporting layer 321 and the second supporting layer 322 are attached to the actuator 380 and also are actuated upward according to the tilting of the actuator 380.

The reflecting member 390 is formed on the first supporting layer 321 and on the second supporting layer 322. The reflecting member 390 reflecting the incident light from the light source tilts with the actuator 380. Hence, the reflecting member 390 reflects the light onto a screen, so the picture is formed on the screen.

In the conventional thin film AMA, the amount of the light reflected by the reflecting member is smaller than that of the light incident to the thin film AMA when considering the area of the thin film AMA, because a supporting portion of the reflecting member is larger than a reflecting portion of the reflecting member. That is, because the supporting portion of the reflecting member which supports during the tilting of the reflecting member according to the tilting to the actuator is larger than the reflecting portion of the reflecting member which actually reflects the incident light, the light efficiency is decreased with respect to the area of the thin film AMA, so the quality of picture projected onto the screen by the thin film AMA is decreased. In addition, the incident light is scattered at a position of supporting portion of the reflecting member which is adjacent to the reflecting portion of the reflecting member because the incident light is also reflected at the position of supporting portion. Hence, the quality of a picture projected onto the screen by the thin film AMA is also decreased.

However, in the thin film actuated mirror array in an optical projection system according to the present invention, the thin film AMA has an actuator which is actuated by a predetermined angle and a reflecting member for reflecting incident light which is separately formed from the actuator to have much enhanced light efficiency by minimizing the area of the actuator and maximizing the area of the reflecting member, so the quality of a picture projected onto a screen is greatly increased.

Although preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array in an optical projection system comprising:

a substrate having electrical wiring and a connecting terminal for receiving the first signal from outside and transmitting the first signal;

an actuator having a bottom electrode for receiving the first signal, a top electrode corresponding to said first bottom electrode for receiving the second signal and generating an electric field between said first top electrode and said first bottom electrode and deformed by the electric field, and a supporting layer having a first portion attached beneath said bottom electrode and a second portion exposed out of said bottom electrode, wherein said bottom electrode, said active layer, and said top electrode each has a U-shape and the second portion of said supporting layer has a rectangular shape; and a reflecting means for reflecting a light, said reflecting means being formed on the second portion of said supporting layer.

2. The thin film actuated mirror array in an optical projection system as claimed in claim 1, wherein said actuator further comprises a via contact for transmitting the first signal from the connecting terminal to said bottom electrode, said via contact being formed in a via hole which is formed from a portion of said active layer to the connecting terminal through said bottom electrode and said supporting layer.

3. The thin film actuated mirror array in an optical projection system as claimed in claim 1, wherein said supporting layer is comprised of a rigid material, said bottom electrode is comprised of an electrically conductive metal, said active layer is comprised of a piezoelectric material or an electrostrictive material, and said top electrode is comprised of an electrically conductive and reflective metal.

4. The thin film actuated mirror array in an optical projection system as claimed in claim 3, wherein said supporting layer is comprised of a nitride or a metal, said bottom electrode is comprised of platinum, tantalum, or platinum-tantalum, said active layer is comprised of Pb(Zr, Ti)O$_3$, (Pb, La)(Zr, Ti)O$_3$, or Pb(Mg, Nb)O$_3$, and said top electrode is comprised of aluminum, platinum, or silver.

5. The thin film actuated mirror array in an optical projection system as claimed in claim 1, wherein said bottom electrode is smaller than the first portion of said supporting layer, said active layer is smaller than said bottom electrode, and said top electrode is smaller than said active layer.

6. The thin film actuated mirror array in an optical projection system as claimed in claim 1, wherein said reflecting means has a rectangular shape.

7. The thin film actuated mirror array in an optical projection system as claimed in claim 1, wherein said reflecting means is comprised of a reflective metal.

8. The thin film actuated mirror array in an optical projection system as claimed in claim 7, wherein said reflecting means is comprised of platinum, aluminum, or silver.

9. A thin film actuated mirror array in an optical projection system being actuated by a first signal and a second signal, said thin film actuated mirror array in an optical projection system comprising:

a substrate having electrical wiring and a connecting terminal for receiving the first signal from outside and transmitting the first signal;

an actuator having a first actuating part having a first bottom electrode for receiving the first signal, said first bottom electrode being formed on a first portion of said substrate, a first top electrode corresponding to said first bottom electrode for receiving the second signal and generating an electric field between said first top electrode and said first bottom electrode, and a first active layer formed between said first top electrode and said first bottom electrode and deformed by the electric field; a second actuating part having a second bottom electrode for receiving the first signal, said second bottom electrode being formed on a second portion of said substrate, a second top electrode corresponding to said second bottom electrode for receiving the second signal and generating an electric field between said second top electrode and said second bottom electrode, and a second active layer formed between said second top electrode and said second bottom electrode and deformed by the electric field; and a supporting layer having a first portion attached beneath said first bottom electrode and beneath said second bottom electrode and a second portion exposed out of said first bottom electrode and said second bottom electrode; and a reflecting means for reflecting a light, said reflecting means being formed on the second portion of said supporting layer, wherein said first actuating part further comprises a first via contact for transmitting the first signal from said connecting terminal to said first bottom electrode, said first via contact being formed in a first via hole which is formed from a portion of said first active layer to said connecting terminal through said first bottom electrode and said supporting layer and said second actuating part further comprises a second via contact for transmitting the first signal from said connecting terminal to said second bottom electrode, said second via contact being formed in a second via hole which is formed from said second active layer to said connecting terminal through said second bottom electrode and said supporting layer.

10. The thin film actuated mirror array in an optical projection system as claimed in claim 9, wherein said supporting layer is comprised of a rigid material, said first bottom electrode and said second bottom electrode are comprised of an electrically conductive metal, said first active layer and said second active layer are comprised of a piezoelectric material or an electrostrictive material, and said first top electrode and said second top electrode are comprised of an electrically conductive and reflective metal.

11. The thin film actuated mirror array in an optical projection system as claimed in claim 10, wherein said supporting layer is comprised of a nitride or a metal, said first bottom electrode and said second bottom electrode are comprised of platinum, tantalum, or platinum-tantalum, said first active layer and said second active layer are comprised of Pb(Zr, Ti)O$_3$, (Pb, La)(Zr, Ti)O$_3$, or Pb(Mg, Nb)O$_3$, and said first top electrode and said second top electrode are comprised of aluminum, platinum, or silver.

12. The thin film actuated mirror array in an optical projection system as claimed in claim 9, wherein said first bottom electrode and said second bottom electrode are formed parallel to each other, said first active layer and said second active layer are formed parallel to each other, and said first top electrode and said second top electrode are formed parallel to each other, and the second portion of said supporting layer has a rectangular shape.

13. The thin film actuated mirror array in an optical projection system as claimed in claim 12, wherein said first bottom electrode is smaller than the first portion of said supporting layer, said first active layer is smaller than said first bottom electrode, said first top electrode is smaller than said first active layer and said second bottom electrode is smaller than the first portion of said supporting layer, said second active layer is smaller than said second bottom electrode, and said second top electrode is smaller than said second active layer.

14. The thin film actuated mirror array in an optical projection system as claimed in claim 9, wherein said reflecting means has a rectangular shape.

15. The thin film actuated mirror array in an optical projection system as claimed in claim 9, wherein said reflecting means is comprised of a reflective metal.

16. A thin film actuated mirror array in an optical projection system being actuated by a first signal and a second signal, said thin film actuated mirror array in an optical projection system comprising:

a substrate having electrical wiring and a connecting terminal for receiving the first signal from outside and transmitting the first signal;

an actuator comprising a first actuating part having a first bottom electrode for receiving the first signal, said first bottom electrode being formed on a first portion of said substrate, a first top electrode corresponding to said first bottom electrode for receiving the second signal and generating an electric field between said first top electrode and said first bottom electrode, a first active layer formed between said first top electrode and said first bottom electrode and deformed by the electric field, and a first supporting layer having a first portion attached beneath said first bottom electrode and a second portion exposed out of said first bottom electrode; and a second actuating part having a second bottom electrode for receiving the first signal, said second bottom electrode being formed on a second portion of said substrate, a second top electrode corresponding to said second bottom electrode for receiving the second signal and generating an electric field between said second top electrode and said second bottom electrode, and a second active layer formed between said second top electrode and said second bottom electrode and deformed by the electric field, and a second supporting layer having a first portion attached beneath said second bottom electrode and a second portion exposed out of said second bottom electrode; and a reflecting means for reflecting a light, said reflecting means being formed on the second portion of said first supporting layer and on the second portion of said second supporting layer, wherein said first actuating part further comprises a first via contact for transmitting the first signal from said connecting terminal to said first bottom electrode, said first via contact being formed in a first via hole which is formed from a portion of said first active layer to said connecting terminal through said first bottom electrode and said first supporting layer, and said second actuating part further comprises a second via contact for transmitting the first signal from said connecting terminal to said second bottom electrode, said second via contact being formed in a second via hole which is formed from a portion of said second active layer to said connecting terminal through said second bottom electrode and said second supporting layer.

17. The thin film actuated mirror array in an optical projection system as claimed in claim 16, wherein said first supporting layer and said second supporting layer are comprised of a rigid material, said first bottom electrode and said second bottom electrode are comprised of an electrically conductive metal, said first active layer and said second active layer are comprised of a piezoelectric material or an electrostrictive material, and said first top electrode and said second top electrode are comprised of an electrically conductive and reflective metal.

18. The thin film actuated mirror array in an optical projection system as claimed in claim 16, wherein said first bottom electrode is smaller than the first portion of said first supporting layer, said first active layer is smaller than said first bottom electrode, said first top electrode is smaller than said first active layer, said second bottom electrode is smaller than the first portion of said second supporting layer, said second active layer is smaller than said second bottom electrode, and said second top electrode is smaller than said second active layer.

19. The thin film actuated mirror array in an optical projection system as claimed in claim 16, wherein said reflecting means has a rectangular shape.

20. The thin film actuated mirror array in an optical projection system as claimed in claim 16, wherein said reflecting means is comprised of a reflective metal.

21. A method for manufacturing a thin film actuated mirror array in an optical projection system being actuated by a first signal and a second signal, said method comprising the steps of:

providing a substrate having electrical wiring and a connecting terminal for receiving the first signal from outside and transmitting the first signal;

forming a first layer on said substrate;

forming a bottom electrode layer, a second layer and a top electrode layer on said first layer;

forming an actuator by patterning said top electrode layer to form a top electrode for receiving the second signal and generating an electric field, by patterning said second layer to form an active layer deformed by the electric field, by patterning said bottom electrode layer to form a bottom electrode for receiving the first signal, and by patterning said first layer to form a supporting layer having a first portion attached beneath said bottom electrode and a second portion exposed out of said bottom electrode, wherein said bottom electrode, said active layer, and said top electrode each has a U-shape and the second portion of said supporting layer has a rectangular shape forming a via hole from a portion of said active layer to said connecting terminal;

forming a via contact for transmitting the first signal to said bottom electrode from said connecting terminal, said via contact being formed in said via hole; and forming a reflecting means for reflecting a light on the second portion of said supporting layer.

22. The method for manufacturing the thin film actuated mirror array in an optical projection system as claimed in claim 21, wherein the step of forming said first layer is performed by a low pressure chemical vapor deposition method by using a nitride or a metal.

23. The method for manufacturing the thin film actuated mirror array in an optical projection system as claimed in claim 21, wherein the step of forming said bottom electrode layer is performed by a sputtering method or a chemical vapor deposition method by using platinum, tantalum, or platinum-tantalum, and the step of forming said top electrode layer is performed by a sputtering method or a chemical deposition method by using aluminum, platinum, or silver.

24. The method for manufacturing the thin film actuated mirror array in an optical projection system as claimed in claim 21, wherein the step of forming said second layer is performed by a sol-gel method, a sputtering method, or a chemical vapor deposition method by using $Pb(Zr, Ti)O_3$, $(Pb, La)(Zr, Ti)O_3$, or $Pb(Mg, Nb)O_3$.

25. The method for manufacturing the thin film actuated mirror array in an optical projection system as claimed in claim 21, wherein the step of forming said second layer further comprises annealing said second layer by a rapid thermal annealing method, and polling said second layer.

26. The method for manufacturing the thin film actuated mirror array in an optical projection system as claimed in claim 21, wherein the step of forming said via contact is performed by a sputtering method or a chemical vapor deposition method by using an electrically conductive metal.

27. The method for manufacturing the thin film actuated mirror array in an optical projection system as claimed in claim 23, wherein the step of forming said reflecting means is performed by a sputtering method or a chemical vapor deposition method by using platinum, aluminum, or silver.

* * * * *